US011622841B2

(12) United States Patent
Prendergast et al.

(10) Patent No.: US 11,622,841 B2
(45) Date of Patent: Apr. 11, 2023

(54) TOOTHBRUSH WITH CONTROLLED SUCTION AND/OR IRRIGATION

(71) Applicant: DIGNITY HEALTH, San Francisco, CA (US)

(72) Inventors: Virginia Prendergast, San Francisco, CA (US); Cynthia Kleiman, San Francisco, CA (US); Charles Lewis, San Francisco, CA (US); Gary Lauterbach, San Francisco, CA (US); Scott Castanon, San Francisco, CA (US); Dylann Ceriani, San Francisco, CA (US); Michael Williams, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 0 days.

(21) Appl. No.: 17/372,212

(22) Filed: Jul. 9, 2021

(65) Prior Publication Data

US 2021/0330432 A1 Oct. 28, 2021

Related U.S. Application Data

(63) Continuation of application No. PCT/US2020/035596, filed on Jun. 1, 2020.
(Continued)

(51) Int. Cl.
*A61C 17/024* (2006.01)
*A61C 17/02* (2006.01)
*A61C 17/22* (2006.01)

(52) U.S. Cl.
CPC ........ *A61C 17/024* (2019.05); *A61C 17/0208* (2013.01); *A61C 17/222* (2013.01); *A61C 17/225* (2013.01)

(58) Field of Classification Search
CPC ... A61C 17/22; A61C 17/0208; A61C 17/227; A46B 9/04; A46B 15/0022; A46B 15/0042; A46B 2200/1066; A46B 11/063
See application file for complete search history.

(56) References Cited

U.S. PATENT DOCUMENTS 4,303,064 A * 12/1981 Buffa .................. A61C 17/028
401/289
5,463,792 A 11/1995 Hogan
(Continued)

FOREIGN PATENT DOCUMENTS

CN 2278448 Y 4/1998
CN 1554316 A 12/2004
(Continued)

OTHER PUBLICATIONS

Machine translation of JP 2011-177397 (Year: 2011).*
(Continued)

*Primary Examiner* — Heidi M Eide
(74) *Attorney, Agent, or Firm* — Kolitch Romano Dascenzo Gates LLC

(57) ABSTRACT

A toothbrush system configured to be coupled to an external suction source. The toothbrush system includes a shaft with a main body with a first end and a second end, and a bristle array and a suction port arranged at the second end. The bristle array and the suction port both extend away from the shaft so that an opening of the suction port is proximal to a distal end of the bristle array. The shaft also includes a stem arranged at the first end. The stem includes a passageway that extends through the main body to provide a fluid connection to the suction port, and is configured to be coupled to the external suction source. Also, the handle is
(Continued)

removably coupled to the shaft and includes a drive system operably coupled to the bristle array to actuate motion of the bristle array.

14 Claims, 15 Drawing Sheets

Related U.S. Application Data

(60) Provisional application No. 62/855,721, filed on May 31, 2019.

(56) References Cited

U.S. PATENT DOCUMENTS

| | | | |
|---|---|---|---|
| 5,544,382 A | 8/1996 | Giuliani et al. | |
| 5,573,398 A | 11/1996 | Towle | |
| 5,593,304 A | 1/1997 | Ram | |
| 5,653,591 A | 8/1997 | Loge | |
| 6,029,304 A | 2/2000 | Hulke | |
| 6,119,296 A | 9/2000 | Noe | |
| 6,164,967 A | 12/2000 | Sale | |
| 6,203,320 B1 | 3/2001 | Williams | |
| 6,217,327 B1 | 4/2001 | Bedi | |
| 6,238,213 B1 | 5/2001 | Young et al. | |
| D457,728 S | 5/2002 | Blaustein | |
| D504,019 S | 4/2005 | Graneto, III | |
| 7,049,790 B2 | 5/2006 | Pfenniger | |
| 7,306,577 B2 | 12/2007 | Lemoine et al. | |
| D561,475 S | 2/2008 | Wang | |
| 8,032,967 B2 | 10/2011 | Jimenez | |
| 8,668,397 B2 | 3/2014 | Barkhordar | |
| 9,237,798 B2 | 1/2016 | Jimenez et al. | |
| 9,351,816 B2 | 5/2016 | Prendergast et al. | |
| 9,974,628 B2 | 5/2018 | Lee | |
| 10,022,209 B2 | 7/2018 | Lee | |
| 10,080,632 B2 | 9/2018 | Lee | |
| 10,111,736 B2 | 10/2018 | Lee | |
| 10,206,766 B2 | 2/2019 | Zachar | |
| 10,327,539 B2 | 6/2019 | Beck | |
| 10,687,612 B2 | 6/2020 | Beck | |
| 2003/0186192 A1 | 10/2003 | Ito | |
| 2005/0147460 A1 | 7/2005 | Han | |
| 2005/0180543 A1 | 8/2005 | Okuyama et al. | |
| 2007/0009857 A1 | 1/2007 | Philp et al. | |
| 2007/0244425 A1* | 10/2007 | Pond | A61C 17/0208 604/27 |
| 2008/0196184 A1* | 8/2008 | Mary T. | A61C 17/22 15/22.1 |
| 2009/0111069 A1 | 4/2009 | Wagner | |
| 2009/0197220 A1* | 8/2009 | Cindrich | A46B 15/00 433/216 |
| 2009/0226241 A1 | 9/2009 | McEwan et al. | |
| 2009/0271936 A1 | 11/2009 | Walanski et al. | |
| 2010/0124729 A1 | 5/2010 | Liao | |
| 2011/0159456 A1 | 6/2011 | Cuevas et al. | |
| 2012/0288320 A1* | 11/2012 | Barkhordar | A46B 11/0006 401/13 |
| 2013/0000059 A1 | 1/2013 | Jungnickel et al. | |
| 2015/0047134 A1 | 2/2015 | Prendergast et al. | |
| 2015/0116854 A1 | 4/2015 | Petroff | |
| 2015/0282912 A1 | 10/2015 | Prins et al. | |
| 2016/0228225 A1 | 8/2016 | Prendergast et al. | |
| 2016/0286948 A1 | 10/2016 | Amron | |
| 2017/0007215 A1 | 1/2017 | Podoly | |
| 2017/0042648 A1* | 2/2017 | Zachar | A61C 17/227 |
| 2017/0112603 A1 | 4/2017 | Lee | |
| 2017/0258217 A1* | 9/2017 | Zachar | A61C 17/222 |
| 2017/0311707 A1 | 11/2017 | Beck | |
| 2017/0347790 A1* | 12/2017 | Zachar | A61C 17/3436 |
| 2019/0029787 A1 | 1/2019 | Zhou | |
| 2019/0117357 A1* | 4/2019 | Boersma | A61C 17/3418 |
| 2021/0145557 A1 | 5/2021 | May | |
| 2021/0191276 A1 | 6/2021 | Shi | |

FOREIGN PATENT DOCUMENTS

| | | | |
|---|---|---|---|
| CN | 2696141 Y | 4/2005 | |
| CN | 2785557 Y | 6/2006 | |
| CN | 101076298 A | 11/2007 | |
| CN | 101632605 A | 1/2010 | |
| CN | 201453403 U | 5/2010 | |
| CN | 201602908 | 10/2010 | |
| CN | 201642397 | 11/2010 | |
| CN | 102008359 A | 4/2011 | |
| CN | 108498199 Y | 9/2018 | |
| EP | 2288273 B1 | 3/2011 | |
| EP | 2830531 A | 2/2015 | |
| FR | 329155 A * | 7/1903 | ........... A46B 11/063 |
| JP | S51143565 U | 11/1976 | |
| JP | 07194619 A | 8/1995 | |
| JP | 11103938 | 4/1999 | |
| JP | 2000139963 A | 5/2000 | |
| JP | 2002045379 A | 2/2002 | |
| JP | 2002058537 | 2/2002 | |
| JP | 2002532121 A | 10/2002 | |
| JP | 2004041691 A | 2/2004 | |
| JP | 2007000495 | 6/2005 | |
| JP | 2006180953 | 7/2006 | |
| JP | 2007504848 A | 3/2007 | |
| JP | 2007144118 A | 6/2007 | |
| JP | 2008029659 | 2/2008 | |
| JP | 2008100037 A | 5/2008 | |
| JP | 2011177397 A | 9/2011 | |
| WO | 2003099063 | 12/2003 | |
| WO | 2013149243 A1 | 10/2013 | |
| WO | 2015116854 | 8/2015 | |
| WO | 2016143974 | 9/2016 | |
| WO | 2018060767 | 4/2018 | |
| WO | 2018129433 A1 | 7/2018 | |

OTHER PUBLICATIONS

International Search Report and Written Opinion for PCT/US2020/035596, dated Sep. 9, 2020 (9 pages).

European Patent Office. Extended European Search Report for application 18735994.8 dated Jul. 10, 2020.

China National Intellectual Property Office. Office Action for application 201910180503.4. dated Mar. 22, 2021. With translation. 27 pages.

* cited by examiner

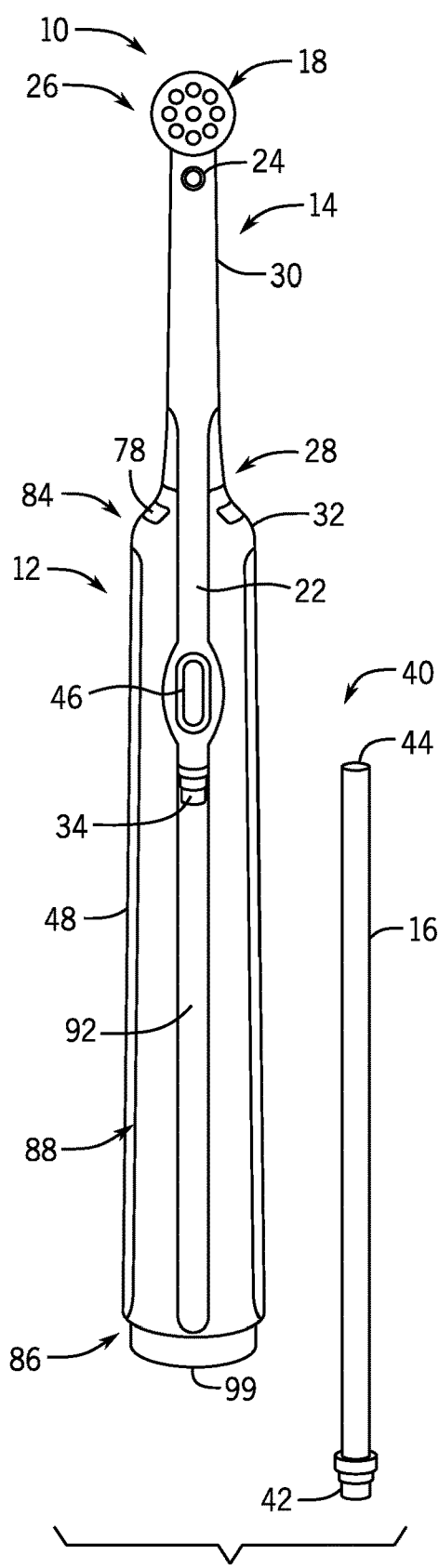
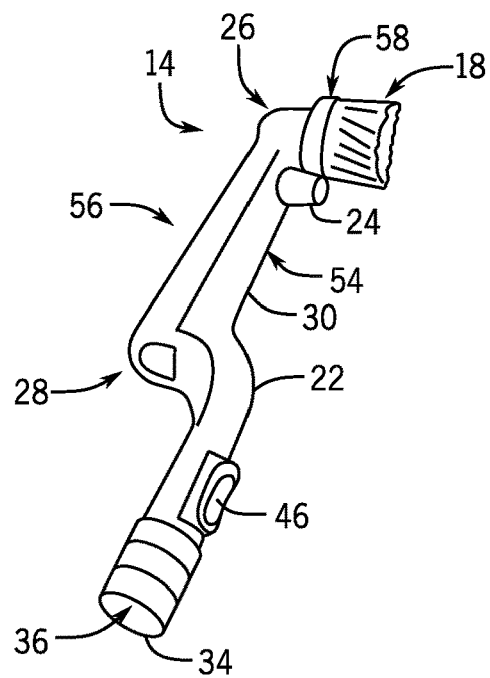
FIG. 3A
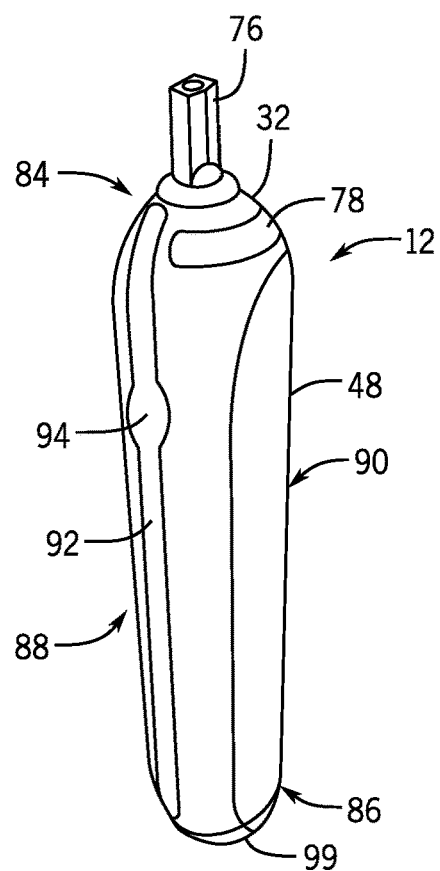
FIG. 2
FIG. 3B

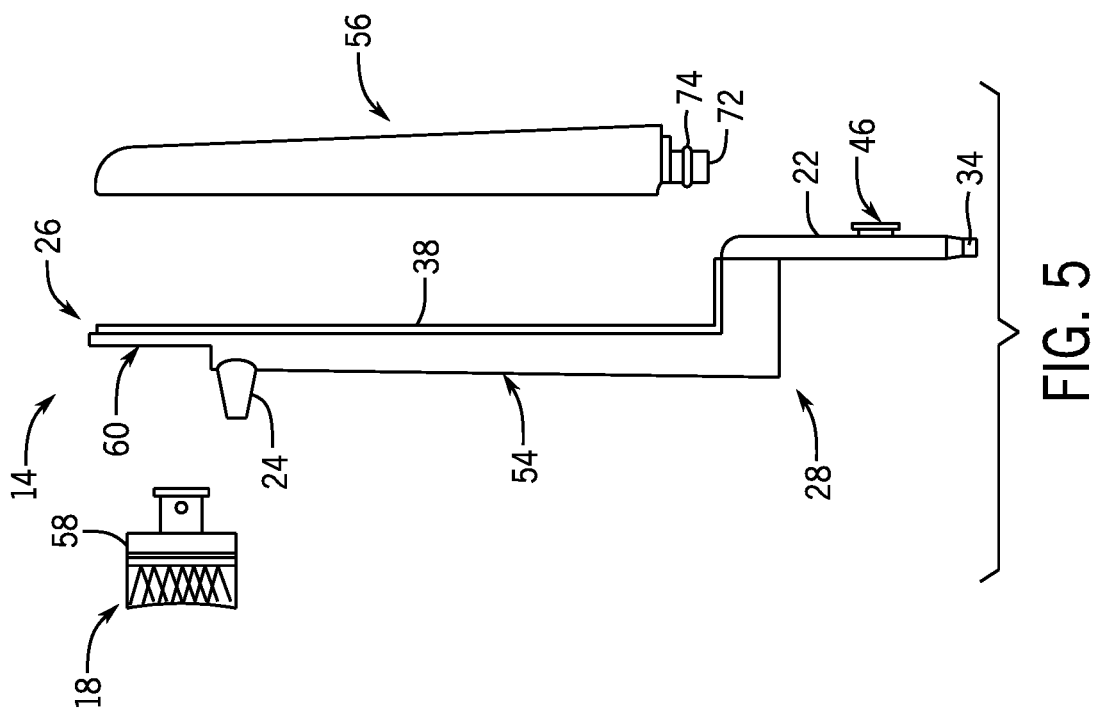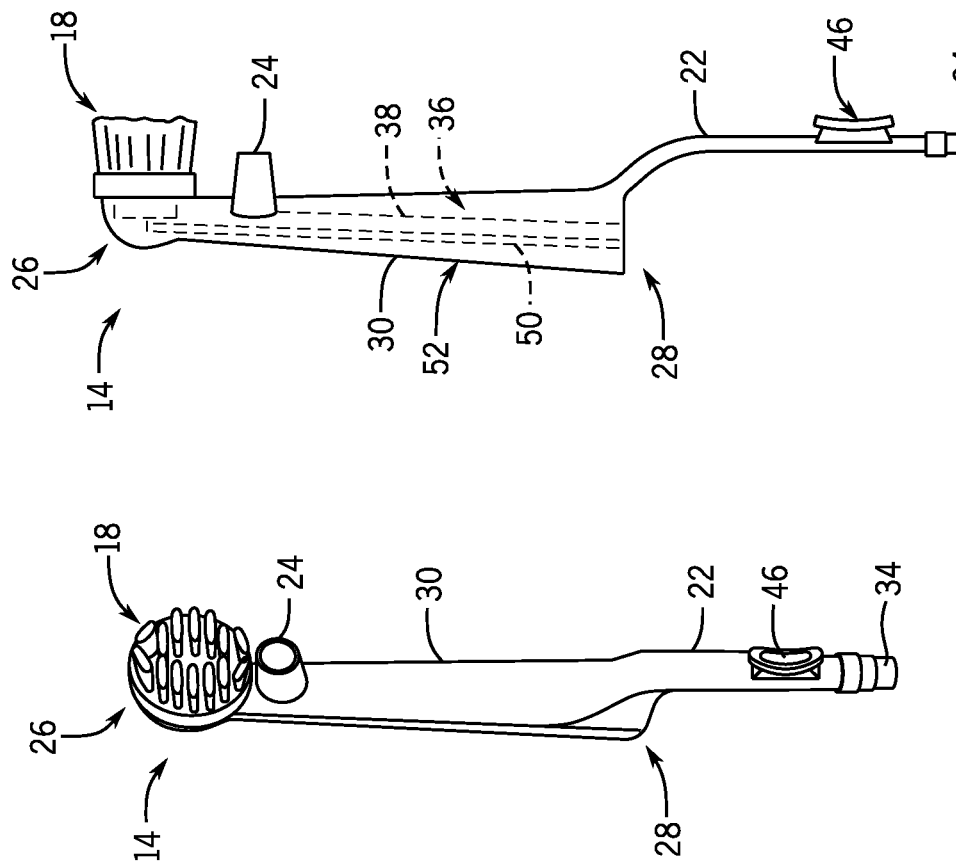

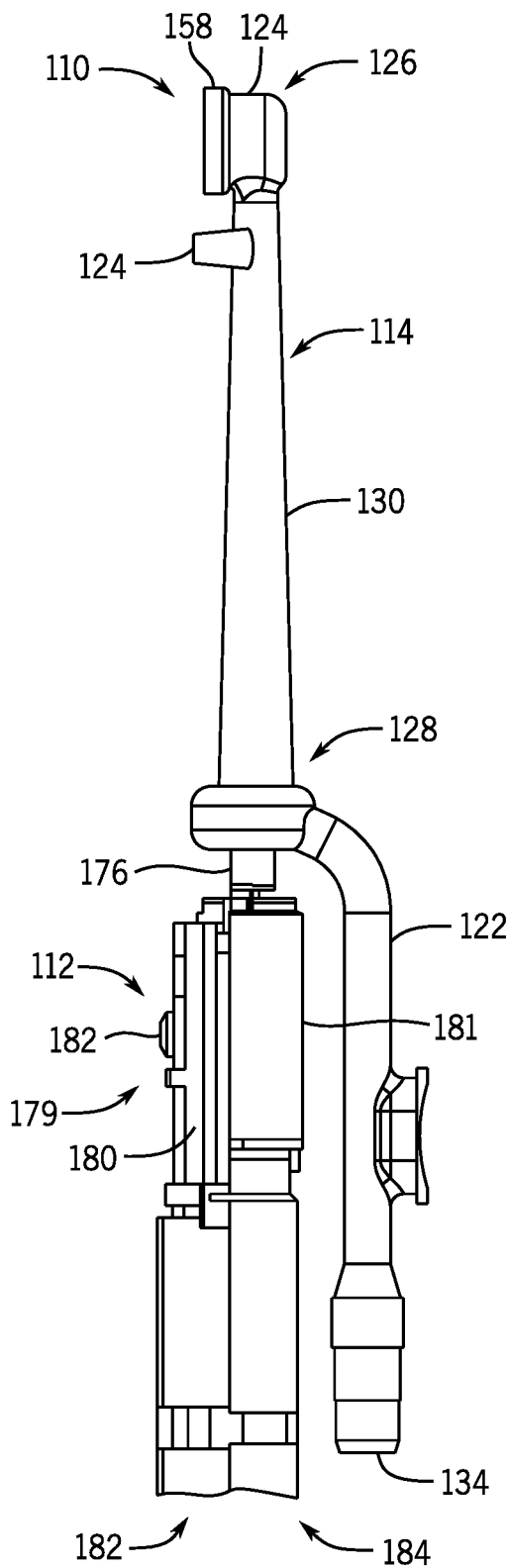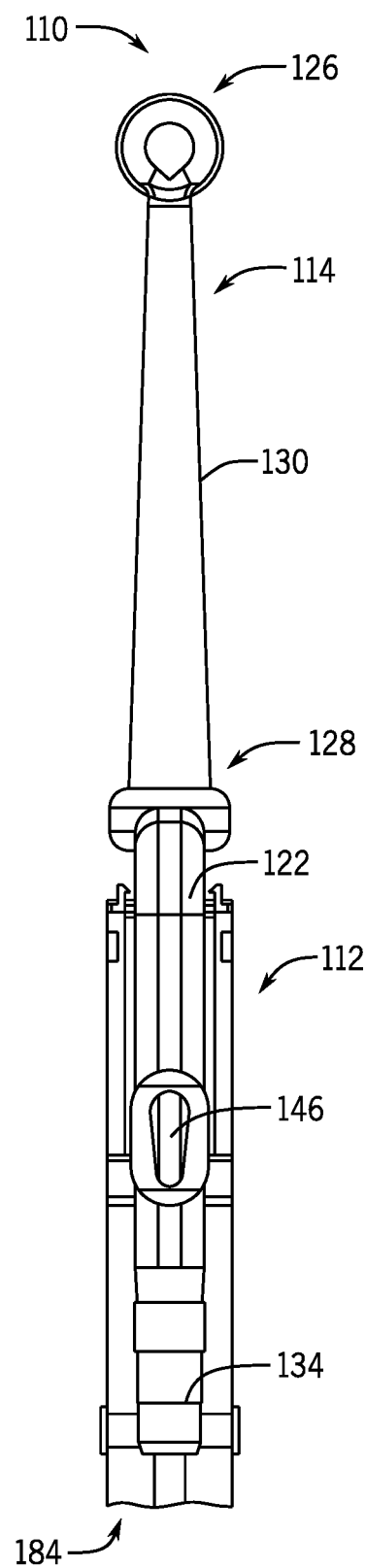
FIG. 9A
FIG. 9B

TOOTHBRUSH WITH CONTROLLED SUCTION AND/OR IRRIGATION

RELATED APPLICATIONS

This application is a continuation of International Application No. PCT/US2020/035596, filed Jun. 1, 2020, which claims priority under 35 U.S.C. § 119 to U.S. Provisional Patent Application No. 62/855,721 filed on May 31, 2019, the entire contents of which is incorporated herein by reference.

BACKGROUND OF THE INVENTION

The present application is directed to toothbrushes. In particular, the present application is directed to toothbrushes designed to accommodate or compensate for a wide variety of impediments to oral hygiene, such as restricted range of oral motion or access, or impediments to operation or interaction with traditional cleaning systems and methods, such as may be common with hospitalized people, people living in residential care facilities, bedridden people, and many other patients.

Oral hygiene is an important consideration in many medical care settings and, particularly, when there are physical impediments to traditional self-care practices. For example, an intensive care unit (ICU) is just one clinical care setting where traditional oral-hygiene techniques may be insufficient. Oral care in an ICU environment is difficult to perform due to physical barriers, such as endotracheal tubes, oral gastric tubes, and bite blocks, that hamper access to the oral cavity. A patient's inability to swallow or expel toothpaste and/or rinsing fluid presents yet another obstacle in providing oral care in such environments. While providing oral hygiene to intubated patients is a technical challenge, doing so is vital for both patients' oral health and overall systemic health and disease prevention.

Various oral care protocols are provided for ICU and other healthcare or long-term care environments, though little evidence supports implementation of such protocols. For instance, manual toothbrushes have been proposed as the ideal method for promoting oral hygiene of orally intubated patients, yet issues with dexterity and efficacy have been described. Additionally, even though foam swabs appear to be inferior in removing oral debris and dried secretions compared to the recommended manual toothbrush, many caregivers still use foam swabs because they require less dexterity to manipulate than a toothbrush. Using manual toothbrushes and foam swabs can allow additional build-up of oral debris and dried secretions can lead to deterioration in a patient's oral health and increased incidence of pneumonia.

Thus, despite the importance of providing effective oral hygiene for patients, effective, easy-to-use oral care tools for hospital or other care environments are lacking. This is a major factor as to why oral care protocols, such as those discussed above, are often incorrectly implemented or ignored altogether.

Therefore, it would be desirable to provide a toothbrush that reduces the dexterity and complexity necessary to clean the teeth and oral cavity of a subject, such as an intubated, hospitalized, or other patient or person who is dependent on others for oral hygiene.

SUMMARY OF THE INVENTION

The present invention overcomes the aforementioned drawbacks by providing a toothbrush designed to accommodate or compensate for a wide variety of impediments to oral hygiene, such as may be common for people that are hospitalized, people that are living in residential care facilities, and/or people that are debilitated.

In accordance with one aspect of the disclosure, a toothbrush system configured to be coupled to an external suction source is provided. The toothbrush system includes a shaft and a handle. The shaft includes a main body with a first end and a second end, and a bristle array and a suction port arranged at the second end. The bristle array and the suction port both extend away from the shaft so that an opening of the suction port is proximal to a distal end of the bristle array. The shaft also includes a stem arranged at the first end. The stem includes a passageway that extends through the main body to provide a fluid connection to the suction port, and is configured to be coupled to the external suction source. Also, the handle is removably coupled to the shaft and includes a drive system operably coupled to the bristle array to actuate motion of the bristle array.

In accordance with one aspect of the disclosure, a toothbrush system configured to be coupled to an external suction source and a syringe is provided. The toothbrush system includes a handle and a shaft extending from the handle. The shaft includes a main body with a distal end and a proximal end, and an internal drive shaft section, a suction passageway, and an irrigation pathway that are sealed from each other. The shaft further includes a bristle array extending from the main body at the distal end, where the bristle array is in communication with a drive shaft positioned within the internal drive shaft section, a flexible suction port extending from the main body adjacent to the bristle array, where the suction port in communication with the suction passageway, and a flexible irrigation port extending from the main body within the bristle array, where the irrigation port is in communication with the irrigation pathway.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 2 is a front view of the electric toothbrush of FIG. 1.

FIG. 3A is a perspective view of a shaft of the electric toothbrush of FIG. 1.

FIG. 3B is a perspective view of a handle of the electric toothbrush of FIG.

FIG. 4A is another perspective view of the shaft of the electric toothbrush of FIG. 1.

FIG. 4B is a side view of the shaft of the electric toothbrush of FIG. 1.

FIG. 5 is an exploded side view of a shaft of an electric toothbrush in accordance with and/or for use with the present invention.

FIG. 9A is a partial side view of an electric toothbrush in accordance with and/or for use with the present invention.

FIG. 9B is a partial back view of the electric toothbrush of FIG. 9A.

DETAILED DESCRIPTION OF THE INVENTION

Figure 1A:
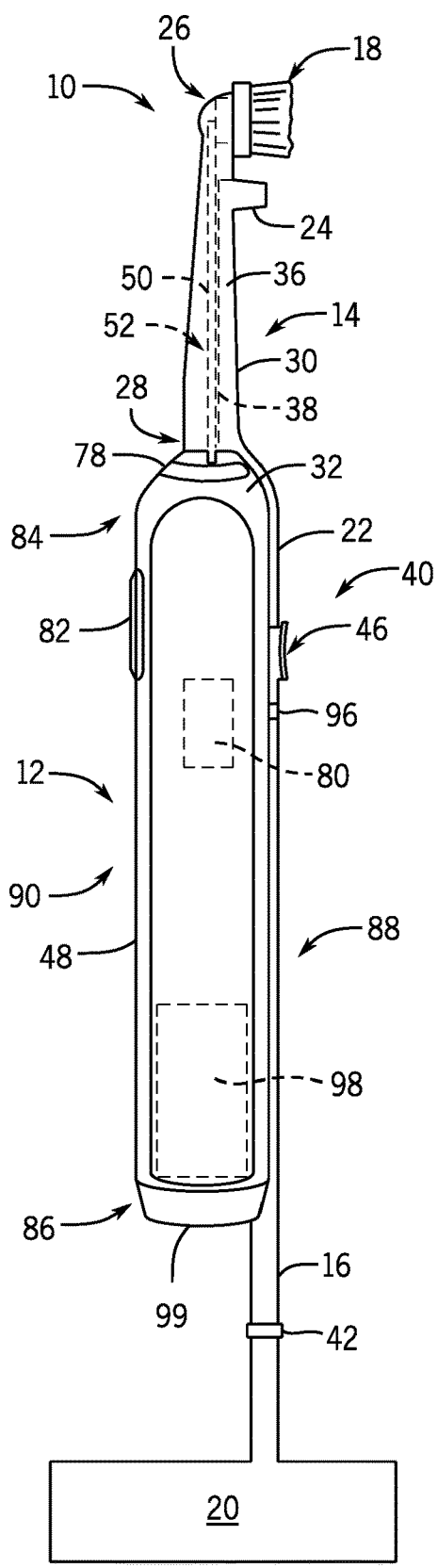
FIG. 1A is a side view of an electric toothbrush in accordance with and/or for use with the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Generally, the present invention provides a toothbrush system designed to accommodate or compensate for a wide variety of impediments to oral hygiene. More specifically, a toothbrush system is provided to care for the oral health of people that are hospitalized, people that are living in residential care facilities, those dependent on others for oral hygiene, and/or people that are debilitated. Furthermore, in some aspects, the toothbrush system can be provided to care for the oral health of the general healthy population as an in-home system. The toothbrush system can be electrically driven and can be formed of modular components designed to separate suction and brushing (and/or irrigation) parts from a handle of the toothbrush, which includes electrical components such as a controller and batteries. In this way, only the suction and brushing (and/or irrigation) parts, which do not include electrical components, are exposed to the transfer of fluids. Further, a modular design provides an easily disposable brushing/suction/irrigation part, so that hygiene can be improved while still employing the same handle with included electrical components. Herein, the terms "oral care recipient," "subject," "user," and "operator" may refer a person on whom the toothbrush system is be operated. The terms "oral care provider," "subject," "user," and "operator" may refer to a person who is operating the toothbrush system to provide oral care to another person.

Figure 1B:
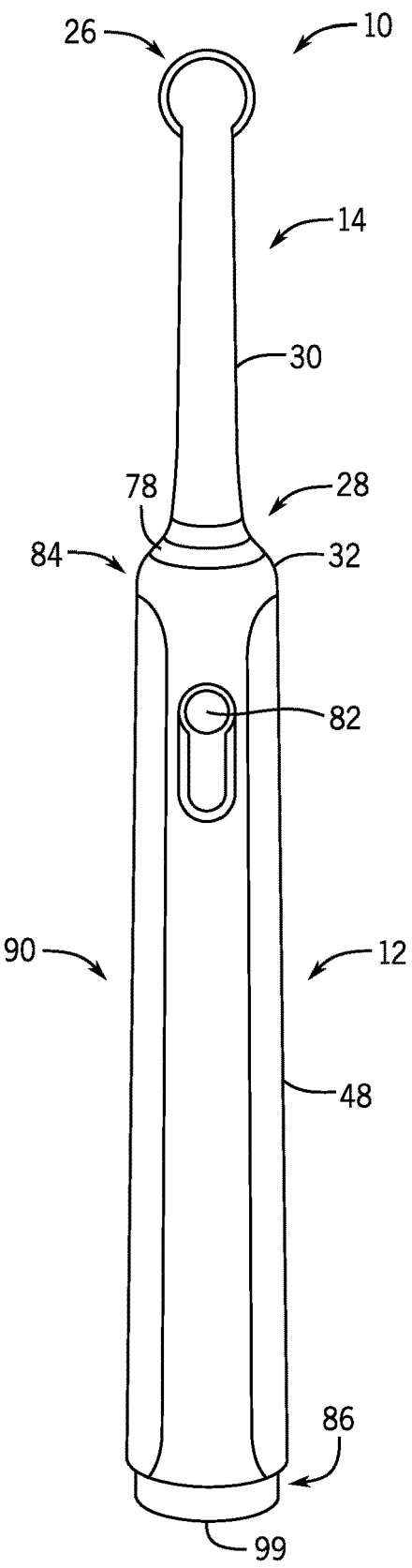
FIG. 1B is a rear view of the electric toothbrush of FIG. 1

One non-limiting example of a toothbrush system 10 is illustrated in FIGS. 1A-7. Generally, as shown in FIGS. 1A-2, the toothbrush system 10 can include a handle 12, a shaft 14, and a suction tube 16. The shaft 14 and the suction tube 16 can both be coupled to the handle 12. For example, the shaft 14 can be operatively coupled to the handle 12 to permit controls within the handle 12 to mechanically operate a bristle array 18 extending from the shaft 14. Furthermore, the suction tube 16 can be coupled to the handle 12, as well as the shaft 14 and a suction device 20, to permit simple, on-demand suction by an operator grasping the handle 12, as further described below. Accordingly, with this configuration, the toothbrush system 10 can provide automated brushing and suction in a handheld, portable toothbrush.

With respect to the shaft 14, as best shown in FIGS. 3A and 4A-7, the shaft 14 can include a stem 22, at least one suction port 24, and a bristle array 18. The shaft 14 generally has a distal end 26 distal from the handle 12 and a proximal end 28 adjacent to the handle 12. The bristle array 18 can be positioned at the distal end 26. The suction port 24 can be positioned near the distal end 26 adjacent to (e.g., not within) the bristle array 18. However, in alternative embodiments, the suction port 24 may be positioned within the bristle array 18 (e.g., between bristles of the bristle array 18). Furthermore, the suction port 24 and the bristle array 18 can extend in parallel outward from the shaft 14 in the same direction. As shown in FIG. 1A, by positioning the suction port 24 adjacent to and below the bristle array 18 and extending from the front of the shaft 14 (e.g., so that an opening of the suction port 24 is adjacent a distal end of the bristle array 18), an oral care provider can visually see, and easily control, the suction of fluids or other waste from an oral care recipient's mouth. To accommodate the care recipient's comfort, the suction port 24 can be comprised of a flexible, pliable, or other material that yields when pressed against the anatomical features of the care recipient's mouth such as the care recipient's gums. The suction port 24 may be a circular port, as illustrated, or can be any variety of shapes, including an oval, circle, tear-drop, or other shapes. Furthermore, in some applications, the suction port 24 can include, for example, more than one (such as two) round- or oval-shaped eyelets.

Furthermore, the stem 22 extends away from a body 30 of the shaft 14 (e.g., at the proximal end 28). In some embodiments, the stem 22 has at least a partially arcuate shape that corresponds with a neck 32 of the handle 12. In this manner, when the shaft 14 is coupled to the handle 12, the stem 22 can engage and follow the curvature of the neck 32 to provide a slim, smooth profile. A slim profile can help permit ease of use with oral care recipients that may have oral obstructions, such as endotracheal tubes. The slim profile can thus help facilitate use in facilities with debilitated patients, where guidelines ordering use of current bulky systems are often ignored due to difficulty of use.

When the shaft 14 is coupled to the handle 12, the stem 22 can extend partially down a length of the handle 12. An end of the stem 22 can include a coupling 34 configured to be coupled to the suction tube 16, as further described below. Additionally, the shaft 14 and the stem 22 can be at least partially hollow to form a passageway 36 (shown in FIG. 4B) that forms a fluid connection extending from the coupling 34 of the stem 22 to the suction port 24. As a result, the suction port 24 and the stem 22 are in fluid communication through the body 30 of the shaft 14 via the passageway 36. For example, the body 30 can include an internal wall 38 that helps define the passageway 36.

The shaft 14 can further be in fluid communication with the suction tube 16 to form a suction system 40 configured to be fluidly coupled to a suction device 20 (as shown in FIG. 1A). In use, the suction system 40 provides a fluid pathway that puts the suction port 24 in fluid communication with the suction device 20. As shown in FIG. 2, the suction tube 16 can include a suction connection 42 and a straight end 44. The suction connection 42 can be of a size and shape to receive or couple to tubing from the suction device 20, and the coupling 34 of the shaft 14 can be of a size and shape to receive or be coupled to the straight end 44 of the suction tube 16. In one example, these couplings may be smooth or barbed and fit together as friction fit couplings.

Generally, the suction system 40 can be coupled to the handle 12 to form the toothbrush system 10. Furthermore, the suction system 40 can be selectively engaged by an operator. For example, the stem 22 can include an aperture 46 that provides an opening in the fluid pathway of the suction system 40 (i.e., between the suction port 24 and the suction device 20), as shown in FIGS. 1A, 2, 3A, 4A, and 4B. The aperture 46 can have a radius of curvature that corresponds to the curvature of a human finger to facilitate ergonomic comfort for the operator. That is, when grasping the handle 12, the user can selectively cover the aperture 46 with their finger or thumb to permit suction from the suction port 24 to the suction device 20, or release the aperture 46 to stop or limit suction. Furthermore, by simply sliding a finger over the aperture 46 to various degrees, the operator can increase or decrease the power of suction while providing oral care. In some forms, the bristle array 18, the suction port 24, and the aperture 46 are all arranged along a front side of the shaft 14. Also, the aperture 46 can be a variety of shapes, including an oval, circle, tear-drop, or other shapes.

Accordingly, the suction system 40 can transfer fluids, such as oral waste, out of an oral care recipient's mouth during the treatment for disposal. Fluid is suctioned from the oral care recipient's mouth first through the suction port 24, then through the passageway 36 in the shaft 14 and the stem 22, and through the suction tube 16. All of the fluid transfer provided by the toothbrush system 10 during oral care treatment can, therefore, be physically contained and separate from the handle 12 so that no fluid is transferred internally through a housing 48 of the handle 12 which, as explained below, can contain electrical components. Separating fluid transfer components and electrical components provides potential benefits to hygiene, safety, and extended use in oral care treatment with the toothbrush system 10.

In addition to suction, the shaft 14 enables automated brushing via the bristle array 18. For example, a drive shaft 50 can extend through the body 30 of shaft 14 to mechanically and/or electrically couple the bristle array 18 to a drive system within the handle 12. The drive system (e.g., via a motor assembly) can enable the drive shaft 50 to provide rotational, oscillating, or vibrational motion to the bristle array 18 upon actuation of a user interface on the handle 12, as further described below. As shown in FIG. 4B, the drive shaft 50 can extend through the body 30 on an opposite side of the wall 38 of the passageway 36 to reach the bristle array 18. Thus, the drive shaft 50 is generally not in contact with fluid of the suction system 40 because the wall 38 separates the passageway 36 from an internal drive shaft section 52 of the shaft 14.

Figure 7:
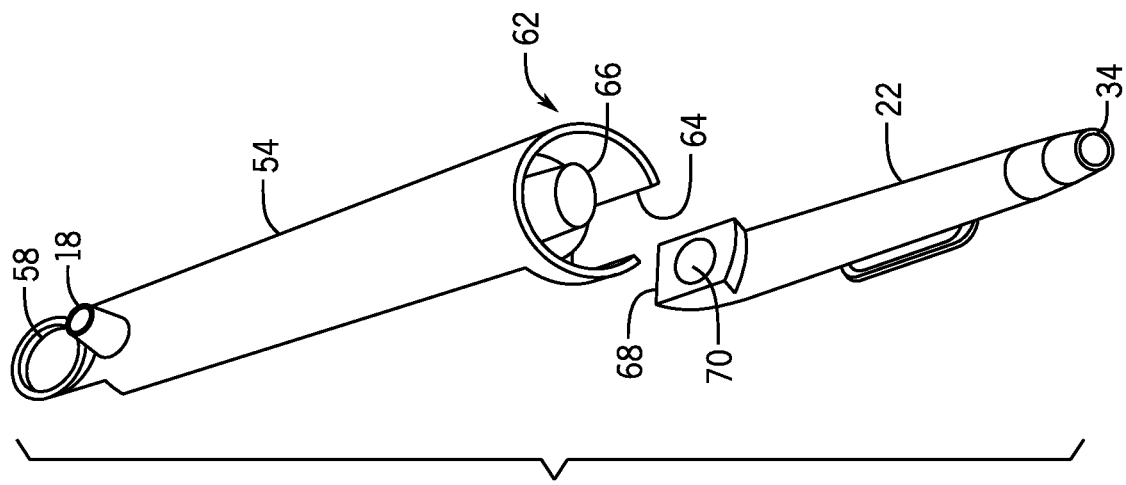
FIG. 7 is a partial exploded view of the shaft of the electric toothbrush of FIG. 5.

In some embodiments, the shaft 14 can be a single, integral component. In other embodiments, the shaft 14 can be formed from multiple components, such as multiple injected molded parts. For example, as shown in FIGS. 5-7, the shaft 14 can include a shaft front 54, a shaft back 56, the stem 22, and a brush head 58. These parts (e.g., the shaft front 52, the shaft back 56, the stem 22, and/or the brush head 58) can be coupled together, for example, via sonic welding, solvent welding, or via other methods of coupling plastic injection molded parts. In some embodiments, all components may be permanently coupled together. In other embodiments, one or more of the components may be configured to be removably coupled together to allow the shaft 14 to be taken apart for cleaning and/or sterilization.

Figure 6B:
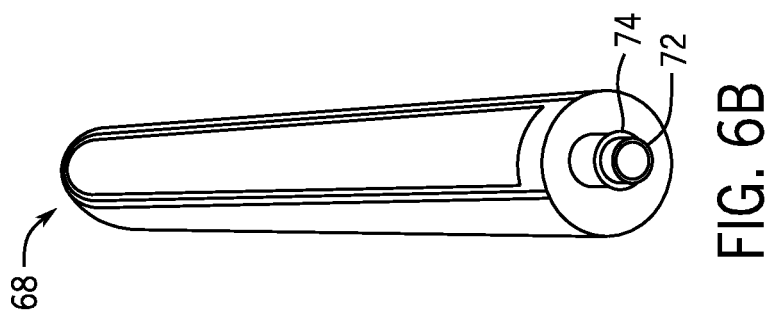
FIG. 6B is a further perspective view of another portion of the shaft of the electric toothbrush of FIG. 5.
Figure 6A:
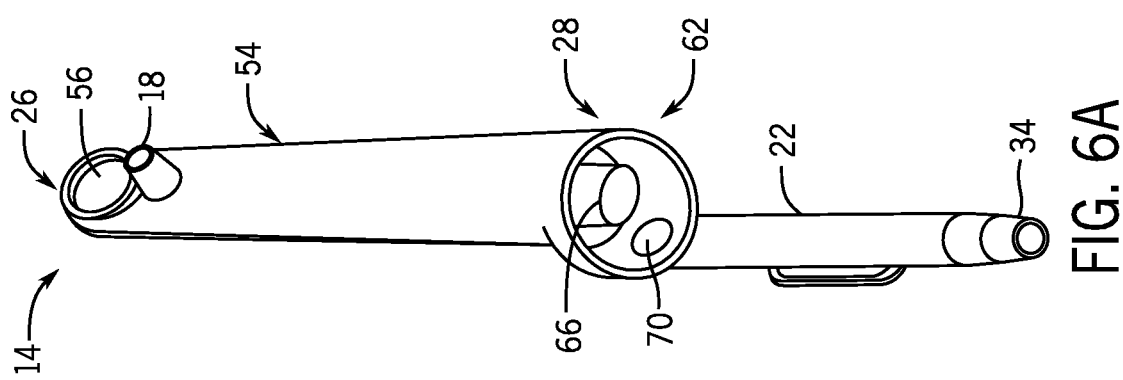
FIG. 6A is a perspective view of a portion of the shaft of the electric toothbrush of FIG. 5.

As shown in FIGS. 5 and 6A, the shaft front 54 can include the suction port 24, a bristle portion 60 formed at the distal end 26, and a coupling portion 62 at the proximal end 28. The suction port 24 can be integrally formed in the shaft front 54, or formed of a flexible polymer that is overmolded or otherwise coupled to the shaft front 54. The bristle portion 60 can be integrally formed with or configured to receive the brush head 58 (e.g., as a separate part that can be permanently or selectively coupled to the bristle portion 60 via ultrasonic welding, solvent welding or otherwise).

As shown in FIG. 7, the coupling portion 62 of the shaft front 54 can include a stem opening 64 and a coupling port 66. In embodiments where the stem 22 is formed as a separate part, the stem 22 includes a head 68 of size and shape corresponding to the stem opening 64 in the shaft front 54. For example, the stem opening 64 can be rectangular in shape with a slight curvature, and the head 68 can be a corresponding rectangular shape so as to fit into the stem opening 64 with an interference of appropriate tightness to align the parts for permanent or semi-permanent coupling. As shown in FIGS. 6A and 7, the head 68 includes an aperture 70 that forms part of the passageway 36 extending through the stem 22 and the body 30 of the shaft 14.

Furthermore, as shown in FIGS. 5 and 6B, the shaft back 56 can be formed as a separate part that is sonically welded to the shaft front 54. The shaft back 56 includes the wall 38 that separates the passageway 36 from the internal drive shaft section 52. The shaft back 56 further includes an inner coupling port 72, which can have an o-ring groove sized to fit an o-ring 74. The inner coupling port 72 can fit into the coupling port 66 of the shaft front 54, where the o-ring 74 can hermetically seal the passageway 36 from the internal drive shaft section 52 when the shaft 14 is fully assembled and coupled to the handle 12. Additionally, the coupling portion 62 can be selectively coupled to and decoupled from an attachment device 76 of the handle 12. For example, the attachment device 76 can include a shaft connector configured to connect a motor shaft of the motor assembly to the drive shaft 50. Accordingly, the shaft 14 can be selectively coupled to and decoupled from the handle 12 to permit reusing the handle 12 with different shafts 24.

More specifically, in some embodiments, various parts of the toothbrush system 10 can be disposable and replaceable. For example, in some embodiments, the shaft 14, the brush head 58, and/or the suction tube 16 can be all removed and replaced after one or more uses. Accordingly, because these components can be removable, disposable, and/or replaceable, the toothbrush system 10 can provide repeated, hygienic oral care. The removability of the shaft 14 and the suction tube 16 also makes it easy to keep the handle 12 clean when using the toothbrush system 10 between multiple patients and/or with multiple shafts 14 and suction tubes 16. Additionally, as noted above, one or more of the components of the shaft 14 may be configured to be removably coupled together to allow the shaft 14 to be taken apart for cleaning and/or sterilization. For example, in applications where the shaft 14 may be reused, the stem 22 may be removable from the shaft front 54 to enable easier cleaning of the passageway 36 (e.g., via a cleaning tool such as a pipe cleaner). In some embodiments, in single-use applications (or multi-use applications), one or more parts of the disposable shaft 14 may further be made of a biodegradable material. Further, the aperture 46 provides ergonomic, comfortable control of the suction functionality of the toothbrush system 10 along the handle 12 while still being separable from the handle 12.

Referring now to the handle 12, as shown in FIGS. 1A-2 and 3B, the handle 12 includes a housing 48, the attachment device 76, a lighting element 78, a drive system including a controller 80, and an activation button 82. The housing 48 has a toothbrush end 84, a suction end 86, a front side 88, which aligns with the front of the shaft 14, and an opposite back side 90. Furthermore, the housing 48 can enclose the lighting element 78, the controller 80, a motor assembly (not shown), and a user accessible compartment 98.

As described above and shown in FIG. 3B, at the toothbrush end 84, the housing 48 can include the attachment device 76 which receives the coupling portion 62 of the shaft 14 and allows selective coupling and decoupling of the shaft 14 to the handle 12. The front side 88 of the housing 48 can include a passage 92 extending longitudinally from the toothbrush end 84 to the suction end 86. The passage 92, as illustrated, may be formed as a groove along an exterior of the housing 48 and can have an internal dimension of a size and shape corresponding to the external dimension of the stem 22 and the suction tube 16. In some forms, the external dimension of the stem 22 and of the suction tube 16 can be sized to provide a snap fit into the passage 92. For example, in some embodiments, the passage 92 can be sized to seat the stem 22 and the suction tube 16, providing a substantially flush profile to the housing 48 when the toothbrush system 10 is fully assembled. Further, the passage 92 can have an enlarged pocket 94, which can be size to receive an overlapping attachment point 96 between the stem 22 and the suction tube 16. The passage 92 contributes to the ease of using toothbrush assembly 10 by providing a guide for the stem 22 and the suction tube 16, while also keeping the profile of the toothbrush assembly 10 comfortable in the hand of the user.

The housing 48 can accommodate the lighting element 78 at the toothbrush end 84 of the handle 12, which is configured to aid in illuminating the mouth of the care recipient. That is, the lighting element 78 can be positioned along the handle 12 to illuminate an area proximate to the bristle array 18. The lighting element 78 can include, for example, one or more LEDs arranged around the toothbrush end 84. For example, a portion of the housing 48 (such as the neck 32) may be at least partially transparent to permit internal LEDs of the lighting element 78 to emit light through the housing 48.

Furthermore, the LEDs are operably coupled to the controller 80 within the housing. For example, the controller 80 may include an internal board on which the LEDs are mounted. The controller 80 can implement a variety of functions through the actuation of the activation button 82, which is also operatively connected to the controller 80. The controller 80 can control the drive system, which can include a motor assembly (not shown), and the mechanical motion produced by the motor assembly can be translated to the bristle array 18 by the drive shaft 50. For example, when the activation button 82 is actuated in a given pattern, the handle 12 and, thus, the bristle array 18 can mechanically actuate, such as vibrate; the lighting element 78 can be turned ON or OFF; and/or the toothbrush system 10 can turn ON (e.g., lighting element 78 ON and the bristle array 18 being actuated) for a set period of time in accordance with oral care standards. Thus, a number of combinations of functioning can occur when a user actuates the activation button 82 of the toothbrush system 10. While the activation button 82 is shown at the back side 90 in FIG. 1A, the activation button 82 can be positioned on the back side 90 or the front side 88 of the handle 12.

Furthermore, as shown in FIG. 1A, the handle 12 can include a user-accessible compartment 98 to hold a portable power source such as a single or multiple batteries. The batteries (not shown) can be replaceable, in which case the handle 12 can include a removable cover 99 for insertion and removal of the batteries within the compartment 98. In some implementations, the batteries can be rechargeable, in which case the handle 12 can include charging leads (not shown) and can be plugged into a charging dock, or can include a charging port for receiving a charging plug.

As described above, generally, the suction system 40 and the handle 12 can be assembled, as modular parts, to form the toothbrush system 10. More specifically, tubing of the suction device 20 can be coupled to the suction tube 16 via the suction connection 42 of the suction tube 16, and the suction tube 16 can be coupled to the shaft 14 via the coupling 34 of the stem 22 to form the suction system 40. The suction system 40 can further be coupled to the handle 12 on the exterior of the housing 48. During use, the aperture 46 provides the user control of suction strength in the oral care recipient's mouth. When the suction device 20 is activated and the aperture 46 is uncovered, the flow of fluid through the suction port 24 is reduced or nonexistent, and when the aperture 46 is covered by the user's finger, the suction produced at the suction port 24 is increased.

In some embodiments, the toothbrush system 10 can also include a secondary cleaning tool 100 (e.g., wherein the vibrating bristle array 18 may be considered a primary cleaning tool). As shown in FIGS. 8A-8F, the secondary cleaning tool 100 can be provided on the shaft 14 and can be formed independent from the suction port 24 or integrated (e.g., overmolded together) with the suction port 24 on the shaft 14. In some forms, the bristle array 18, the suction port 24, and the secondary cleaning tool 100 are all arranged on the front of the shaft 14. For example, the bristle array 18, the suction port 24, and the secondary cleaning tool 100 can all extend away from the shaft 14 in parallel. In some embodiments, the secondary cleaning tool 100 can include a plurality of resilient projections 102. Furthermore, the bristle array 18 (e.g., the primary cleaning tool) may be formed of a first polymeric material while the secondary cleaning tool 100 may be formed of a second polymeric material.

By providing the secondary cleaning tool 100 on the front of the shaft 14 along with the bristle array 18 and the suction port 24, the oral care provider can switch between multiple cleaning functions (e.g., brushing, suction, massage, etc.) while providing oral care without having to rotate the handle 12 around in the oral care provider's palm. For example, placing the secondary cleaning tool 100 on the front of shaft 14 provides an additional method of cleaning that can be applied to different pathologies in the mouth, e.g., teeth versus gums versus tongue. The placement of secondary cleaning tool 100 on the front of the shaft 14 can also provide more control for the user.

Figure 8C:
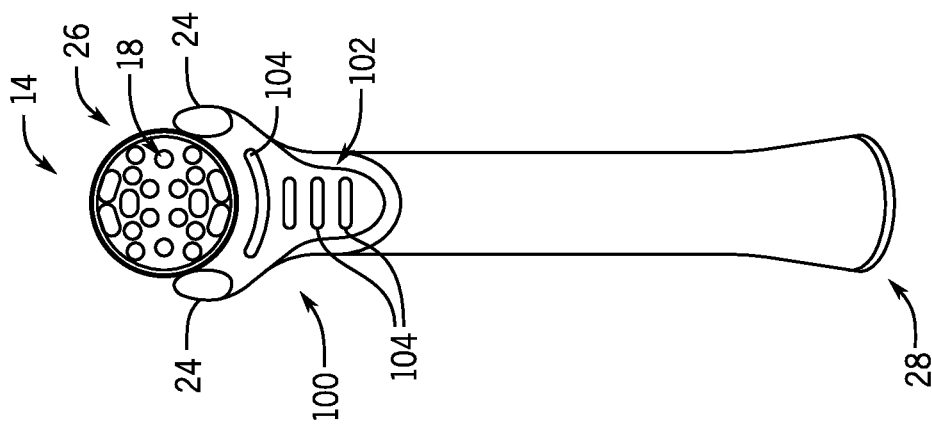
FIG. 8C is a front view of a shaft of an electric toothbrush in accordance with and/or for use with the present invention.
Figure 8B:
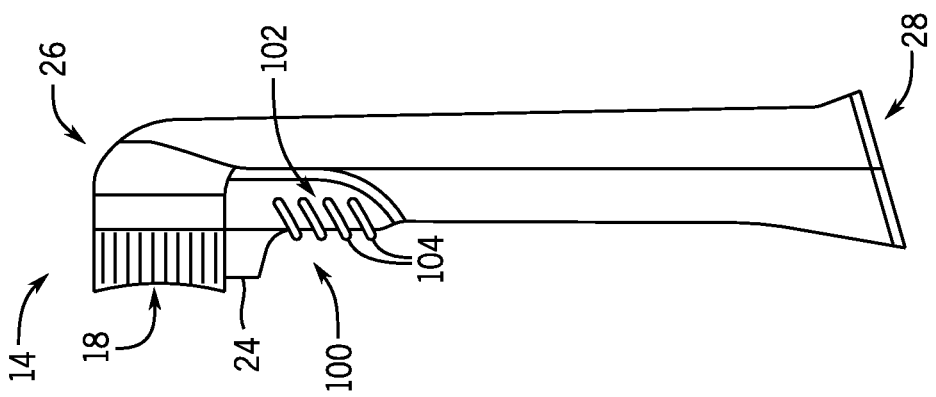
FIG. 8B is a side view of the shaft of FIG. 8A.
Figure 8A:
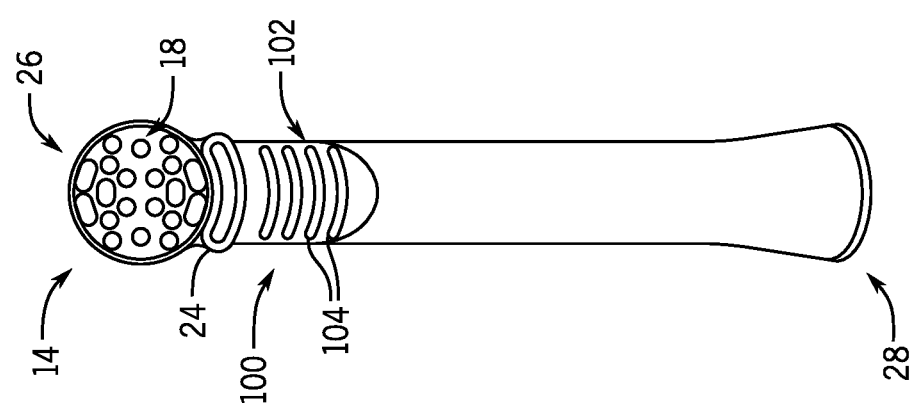
FIG. 8A is a front view of a shaft of an electric toothbrush in accordance with and/or for use with the present invention.

FIGS. 8A-8F illustrate different arrangements of the secondary cleaning tool 100 and the suction port 24. It should be noted that the secondary cleaning tool 100 and the suction port 24 arrangements can be applied to any toothbrush system described herein. According to a first example shown in FIGS. 8A and 8B, the suction port 24 is arranged adjacent to and between the bristle array 18 and the secondary cleaning tool 100. The plurality of resilient projections 102 in FIGS. 8A and 8B are formed as arced ridges 104. Further, the suction port 24 is formed as a semi-circular arc that generally extends partially around the perimeter (e.g., about the width) of the bristle array 18.

According to a second example shown in FIGS. 8C and 8D, the secondary cleaning tool 100 is positioned below the bristle array 18. The resilient projections 102 are formed as arced ridges 104, similar to the example of FIGS. 8A and 8B. However, the suction port 24 is bifurcated halfway around the perimeter of the bristle array 18, creating two suction ports 30 on either side of the bristle array 18. Also, the arced ridges 104 are more pronounced than the embodiment shown in FIGS. 8A and 8B, and can extend outward from the shaft 14 about half the distance that the bristle array 18 extends away from the shaft 14.

Figure 8F:
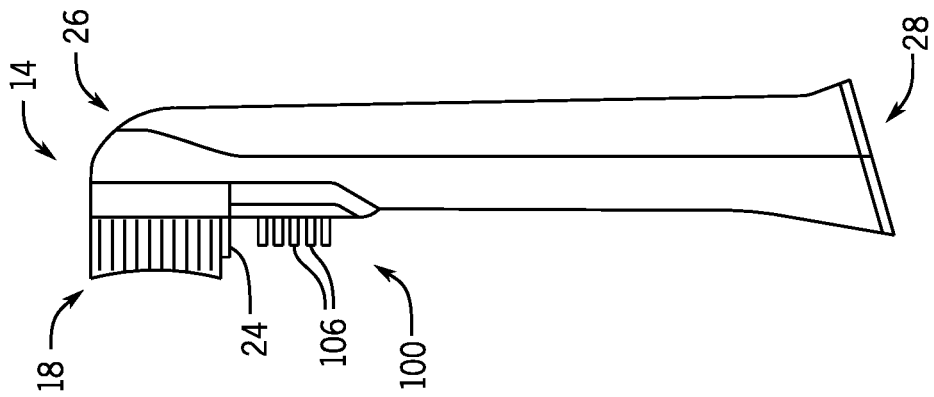
FIG. 8F is a side view of the shaft of FIG. 8E.
Figure 8E:
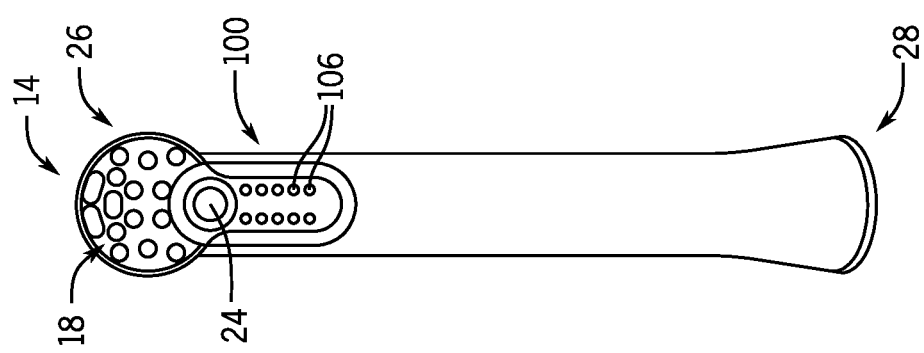
FIG. 8E is a front view of a shaft of an electric toothbrush in accordance with and/or for use with the present invention.
Figure 8D:
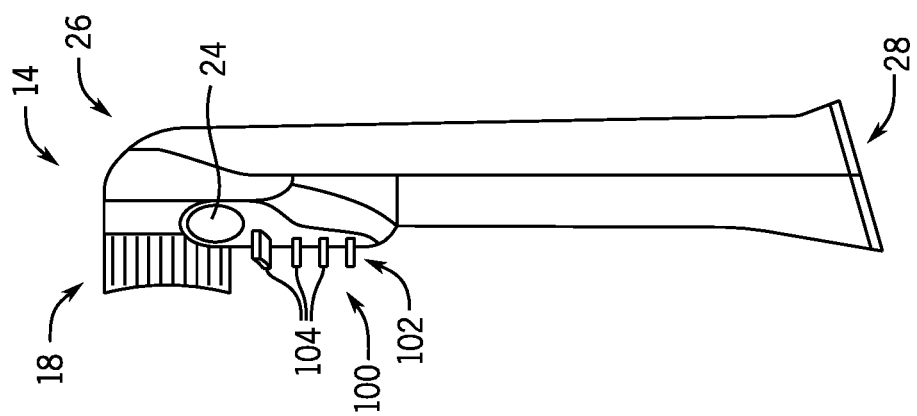
FIG. 8D is a side view of the shaft of FIG. 8C.

According to a third example shown in FIGS. 8E and 8F, the secondary cleaning tool 100 is formed as an array of flexible tendrils 106 extending away from the shaft 14 in parallel with the bristle array 18. For example, the flexible tendrils 106 can extend a length less than the extension length of the bristle array 18. Furthermore, as shown in FIGS. 8E and 8F, while the secondary cleaning tool 100 is positioned below the bristle array 18, the suction port 24 can extend into the bristle array 18 so that the bristle array 18 at least partially surrounds the suction port 24.

FIGS. 9A-9B illustrate another non-limiting example of a toothbrush system 110. The toothbrush system 110 can include a number of like features to toothbrush system 10, and any or all of the functions and structures of the toothbrush system 10 can be implemented in the analogous parts of the toothbrush system 110.

Figure 9C:
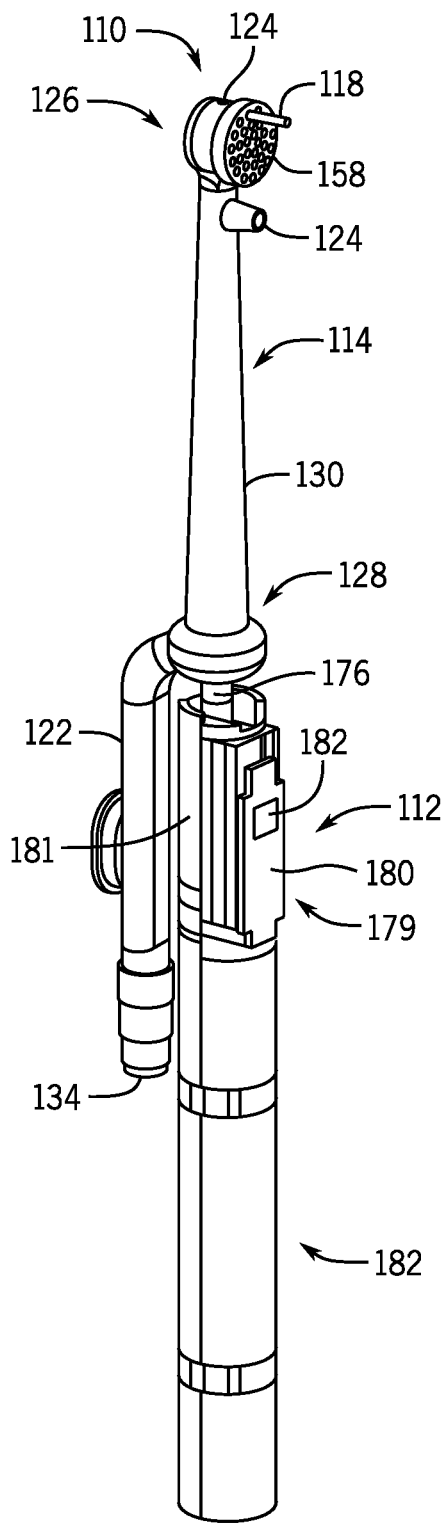
FIG. 9C is a partial front perspective view of the electric toothbrush of FIG. 9A.
Figure 9D:
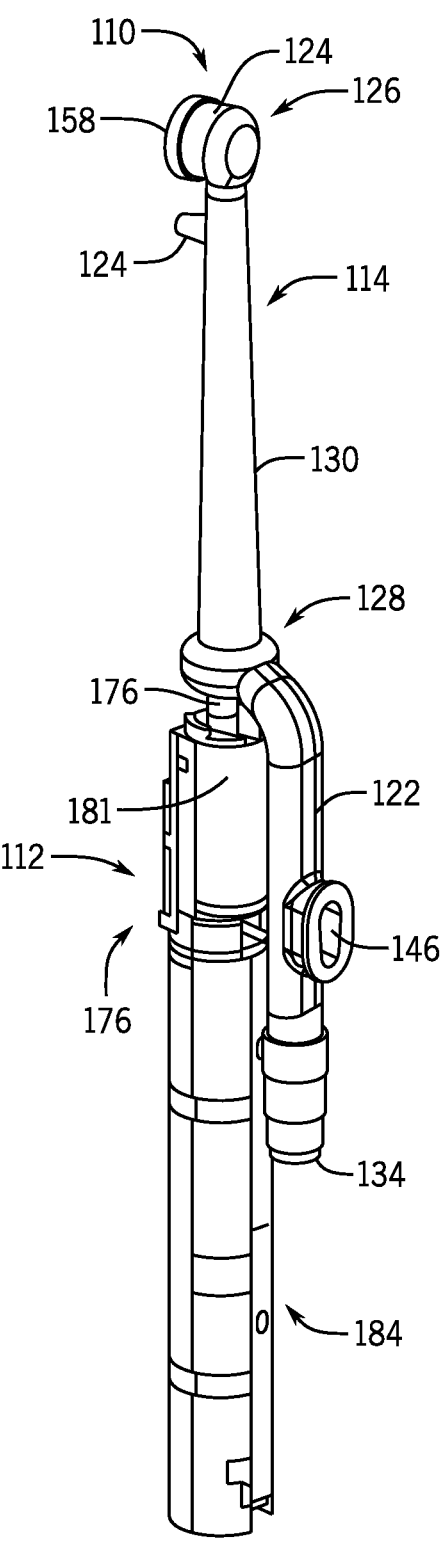
FIG. 9D is partial rear perspective view of the electric toothbrush of FIG. 9A.
Figure 10:
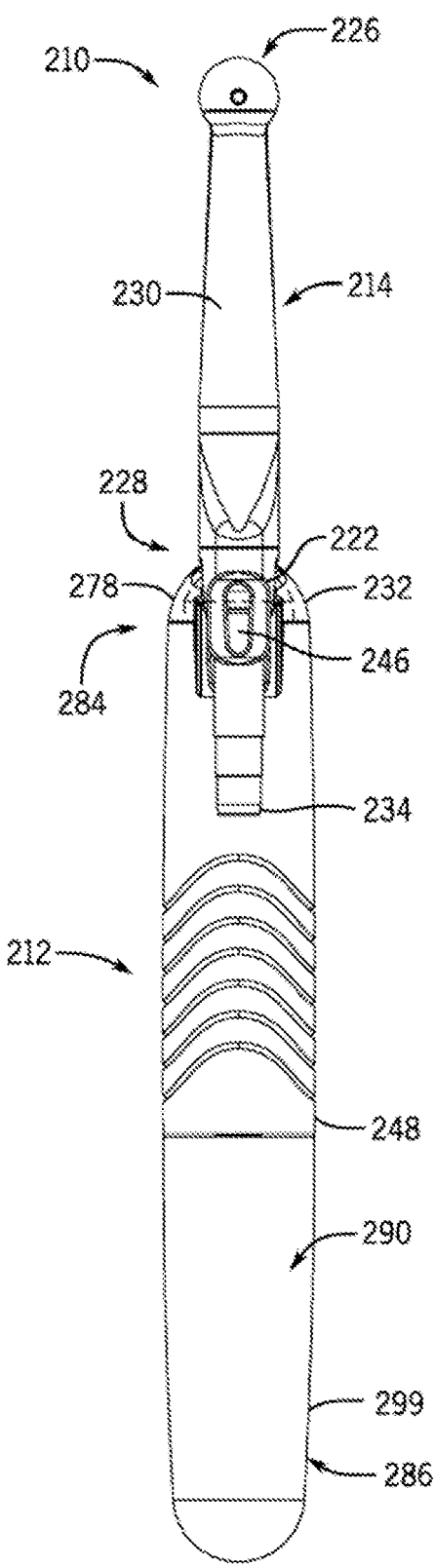
FIG. 10 is a rear view of an electric toothbrush in accordance with and/or for use with the present invention.

For example, as shown in FIGS. 9A-9D, the toothbrush system 110 includes a handle 112 and a shaft 114. The shaft 114 can include a stem 122, at least one suction port 124, and a bristle array 118 (though shown as a single bristle in FIG. 9C, the bristle array 118 may be similar to the bristle array 18 of FIGS. 1-7). The suction port 124 can be positioned adjacent to, though not within, the bristle array 118 and, more specifically, can be positioned at the crown, or distal end 126, of the shaft 114. In some forms, additional suction ports 124 may be positioned on the shaft 114. For example, one suction port 124 can be positioned on the crown 126 of the shaft 114 and one suction port 124 can be positioned below the bristle array 132, as shown in FIG. 9A.

The stem 122 can extend along a back side 190 of the handle 112 when the shaft 114 is coupled to the handle 112 (e.g., in contrast to the stem 22 of FIGS. 1-7, which is located at the front side 88 of the handle 12). The stem 122 can include a coupling 134, such as a barbed structure, that can be of a size and shape to receive tubing from a suction device (not shown), for example, via a friction fit. The suction port 124 and the coupling 134 of the stem 122 are in fluid communication through the body 130 of the shaft 114 (e.g., via a passageway), and, thus, in fluid communication with the suction device when the stem 122 is coupled to the tubing of the suction device. In some forms, an aperture 146 is disposed along the stem 122, providing an opening between the suction port 124 and the suction device. As described above, the aperture 146 can be selectively uncovered or covered to permit various degrees of suction through the suction port 124.

The shaft 114 can be coupled to the handle 112 via a coupling portion (not shown), which interacts with a housing of the handle 112 to removably couple the shaft 114 to the handle 112. It should be noted that the housing of the handle 112 is not shown in FIGS. 9A-9D to better illustrate internal components of the handle 112, such as a drive system 179 and a controller 180, which are enclosed by the housing. Additionally, when coupled to the handle 112, the stem 122 can extend down a length of the handle 112 so that the user grasping the handle 112 can easily engage the aperture 146 with their finger or thumb.

In some forms, the shaft 114 is also coupled to the handle 112 by an attachment device 176 in communication with the drive shaft 150. That is, the drive shaft 150 can extend from the handle 112 through the body 130 of shaft 114 and mechanically and/or electrically couple the bristle array 118 to the drive system 179 within the handle 112 via the attachment device 176. As a result, the drive shaft 150 can provide rotational, oscillating, or vibrational motion to the bristle array 118. Furthermore, the handle 112 can include a controller 180 that controls the drive system 179, including a motor assembly 181 of the drive system 173. The motor assembly 181 can be coupled to the drive shaft 150 so that mechanical motion produced by the motor assembly 181 can be translated to the bristle array 118 via the drive shaft 150. Similar to the drive system described above, the handle 112 can include an activation button 182 which, when pressed in a particular pattern, can implement all of the functions described above with respect to toothbrush system 10. For example, though not shown in FIGS. 9A-9D, the toothbrush system 110 can also include a lighting element positioned along a toothbrush end 184 of the housing that emits light when the activation button 182 is activated.

Furthermore, the handle 112 can include a user-accessible compartment 198 to hold a portable power source such as one or more batteries (not shown). The batteries can be replaceable, in which case the handle 112 (and, more specifically, the housing) can include a removable cover for insertion and removal of the batteries within the compartment 198, similar to the compartment 98 and batteries described above with respect to toothbrush system 10.

FIGS. 10-18 illustrate another non-limiting example of a toothbrush system 210. The toothbrush system 210 can include a number of like features to toothbrush systems 10, 110, and any or all of the functions and structures of the toothbrush systems 10, 110 can be implemented in the analogous parts of the toothbrush system 210.

Generally, as shown in FIGS. 10-18, the toothbrush system 210 can include a handle 212 and a shaft 214 configured to be coupled to the handle 212. For example, the shaft 214 can be operatively coupled to the handle 212 to permit controls within the handle 212 to mechanically operate a bristle array 218 extending from the shaft 214. Furthermore, a suction tube can be coupled to the shaft 214 and a suction device to permit simple, on-demand suction by an operator grasping the handle 212, as further described below. For example, the suction tube may be flexible tubing of the suction device, or may be a separate structured tube like the suction tube 16 of FIGS. 1A-7. Accordingly, with this configuration, the toothbrush system 210 can provide automated brushing and suction in a handheld, portable toothbrush.

Figure 11:
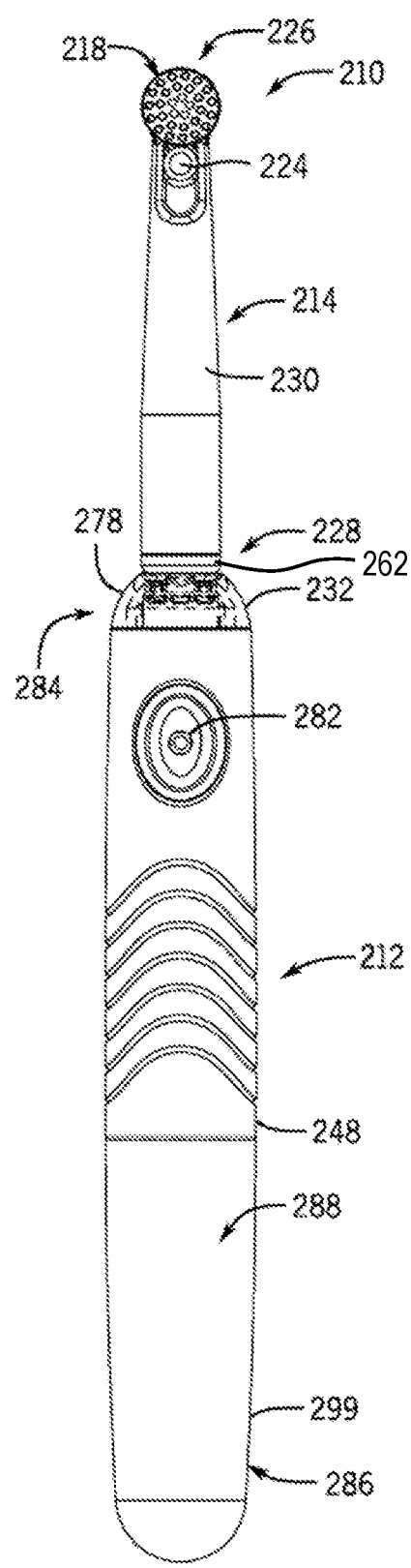
FIG. 11 is a front view of the electric toothbrush of FIG. 10.
Figure 12:
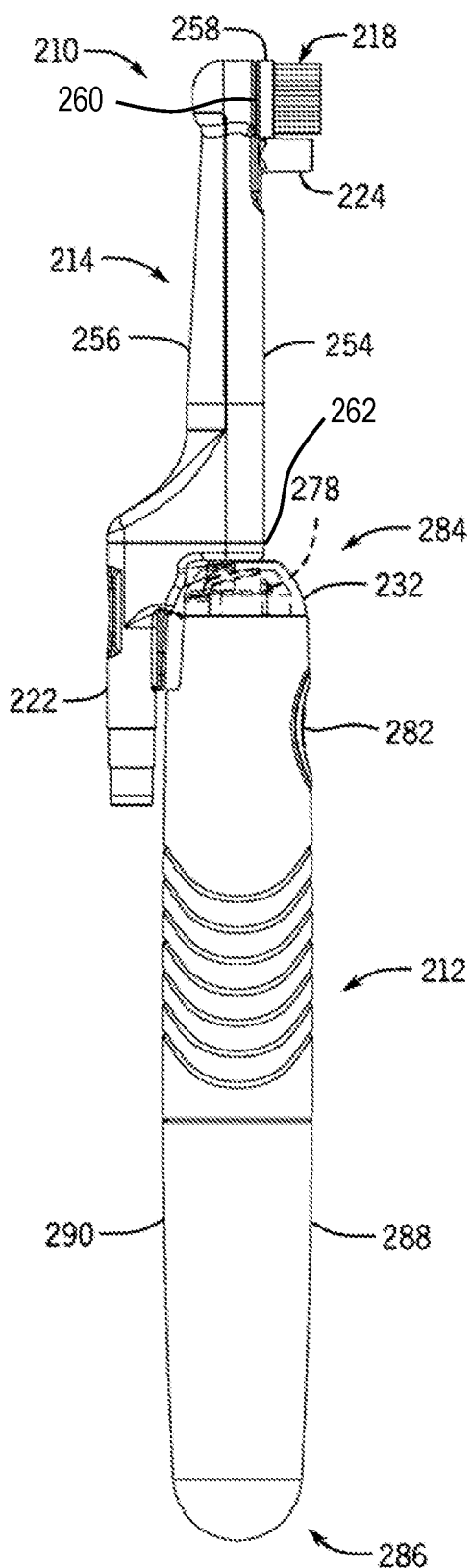
FIG. 12 is a first side view of the electric toothbrush of FIG. 10.
Figure 13:
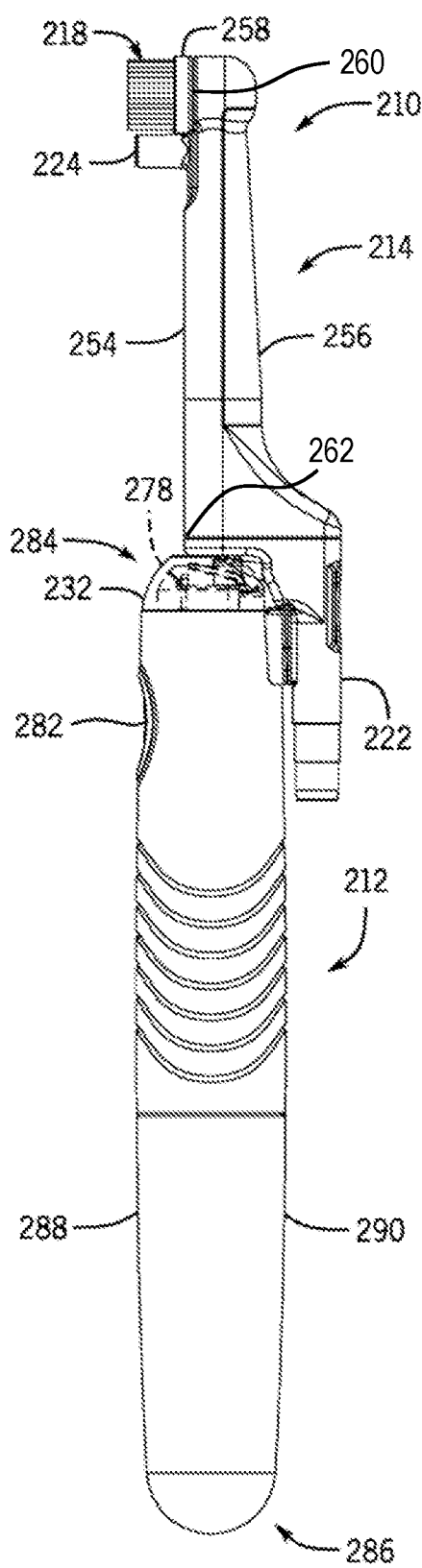
FIG. 13 is a second side view of the electric toothbrush of FIG. 10.
Figure 14:
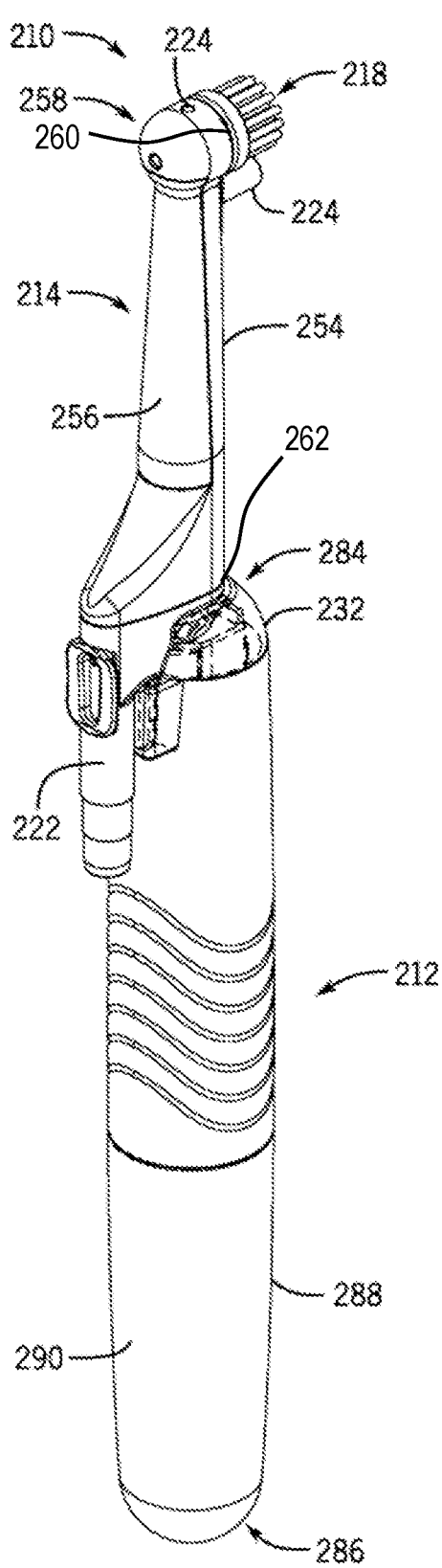
FIG. 14 is a rear perspective view of the electric toothbrush of FIG. 10.
Figure 15:
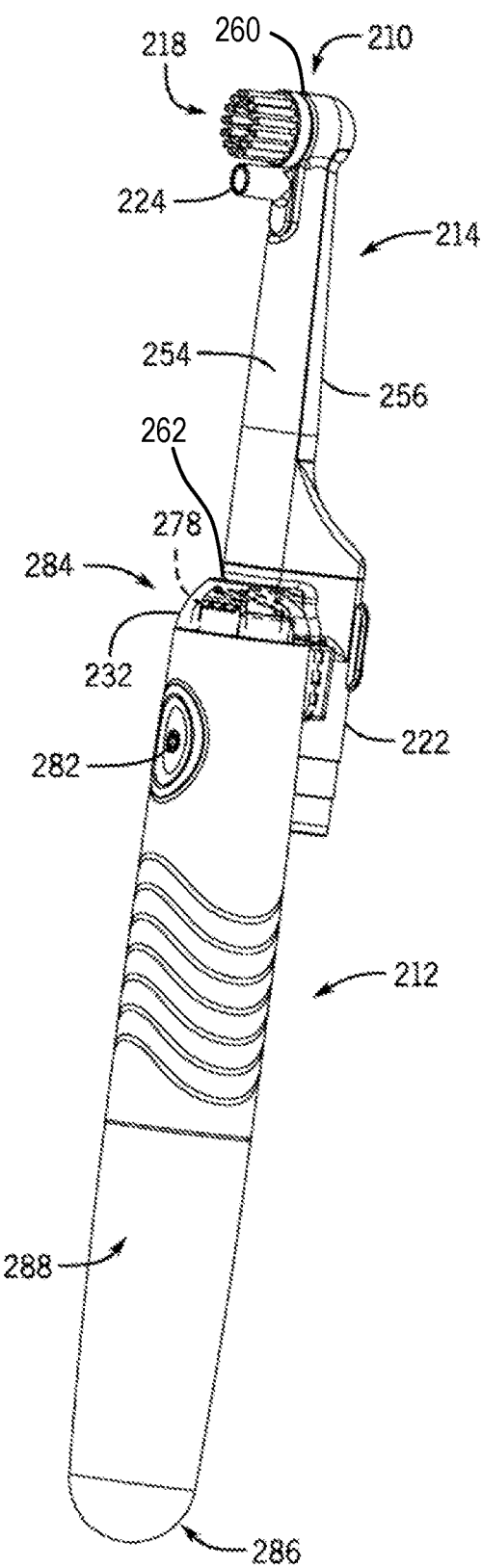
FIG. 15 is a front perspective view of the electric toothbrush of FIG. 10.
Figure 16:
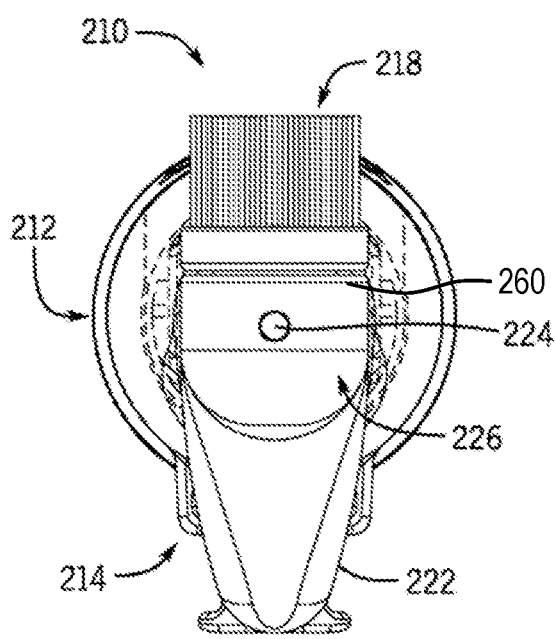
FIG. 16 is a top view of the electric toothbrush of FIG. 10.
Figure 17:
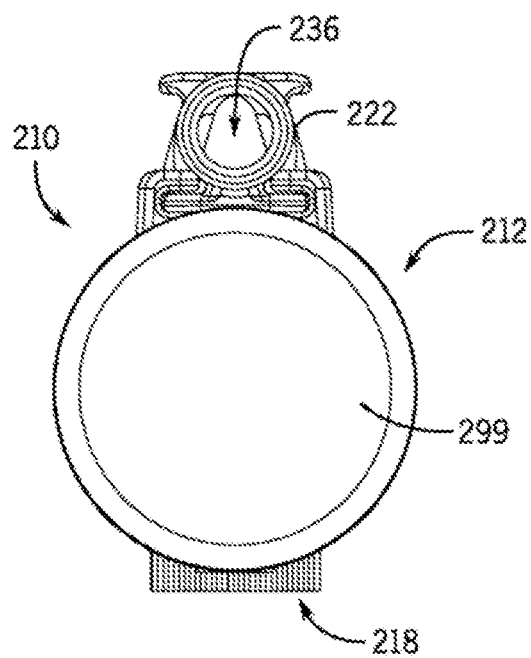
FIG. 17 is a bottom view of the electric toothbrush of FIG. 10.
Figure 18:
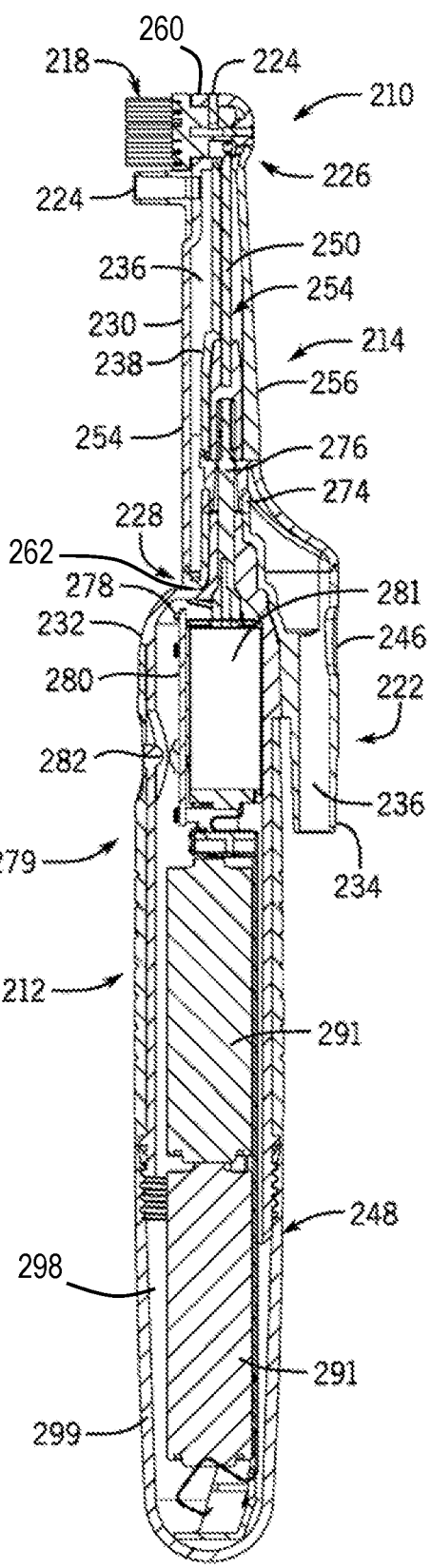
FIG. 18 is a cross-sectional view of the electric toothbrush of FIG. 10.

With respect to the shaft 214, as best shown in FIGS. 12-15 and 18, the shaft 214 can include a stem 222, at least one suction port 224, and a bristle array 218. The shaft 214 generally has a distal end 226 distal from the handle 212 and a proximal end 228 adjacent to the handle 212. The bristle array 218 can be positioned at the distal end 226. The suction port 224 can be positioned near the distal end 226 adjacent to (e.g., not within) the bristle array 218. However, in alternative embodiments, the suction port 224 may be positioned within the bristle array 218 (e.g., between bristles of the bristle array 218). Furthermore, the suction port 224 and the bristle array 218 can extend in parallel outward from the shaft 14 in the same direction. As shown in FIGS. 11-13, by positioning the suction port 224 adjacent to and below the bristle array 218, and extending from the front of the shaft 214, an oral care provider can visually see, and easily control, the suction of fluids or other waste from an oral care recipient's mouth. To accommodate the care recipient's comfort, the suction port 224 can be comprised of a flexible, pliable, or other material that yields when pressed against the anatomical features of the care recipient's mouth such as the care recipient's gums. Additionally, as shown in FIGS. 14, 16, and 18, the shaft 214 can include an additional suction port 224 located along the crown, or distal end 226 and formed as an aperture in the shaft 214.

Furthermore, the stem 222 extends away from a body 230 of shaft 214 (e.g., at the proximal end 228). In some embodiments, the stem 222 has at least a partially arcuate shape that corresponds with a neck 232 of the handle 212. In this manner, when the shaft 214 is coupled to the handle 212, the stem 222 can engage and follow the curvature of the neck 232 to provide a slim, smooth profile. A slim profile can help permit ease of use with oral care recipients that may have oral obstructions, such as endotracheal tubes. The slim profile can thus help facilitate use in facilities with debilitated patients, where guidelines ordering use of current bulky systems are often ignored due to difficulty of use. Additionally, in some embodiments, the handle 212 can include a track into which the stem 222 can slide for easy coupling of the shaft 214 to the handle 212.

When the shaft 214 is coupled to the handle 212, the stem 222 can extend partially down a length of the handle 212. An end of the stem 222, distal from the bristle array 218, can include a coupling 234 configured to be coupled to the suction tube, as further described below. Additionally, the shaft 214 and the stem 222 can be at least partially hollow to form a passageway 236 that forms a fluid connection extending from the coupling 234 of the stem 222 to the suction ports 224. As a result, the suction ports 224 and the stem 222 are in fluid communication through the body 230 of the shaft 214 via the passageway 236. For example, the body 230 can include an internal wall 238 that helps define the passageway 236.

The shaft 214 can further be in fluid communication with the suction tube to form a suction system configured to be fluidly coupled to a suction device (like the suction device 20 shown in FIG. 1A). In use, the suction system provides a fluid pathway that puts the suction port 224 in fluid communication with the suction device. Generally, the coupling 234 of the shaft 214 can be of a size and shape to receive or be coupled to suction tubing. In one example, these couplings may be smooth or barbed and fit together as friction fit couplings.

Generally, the suction system can be coupled to the handle 212 to form the toothbrush system 210. Furthermore, the suction system can be selectively engaged by an operator. For example, the stem 222 can include an aperture 246 that provides an opening in the fluid pathway of the suction system (i.e., between the suction ports 224 and the suction device). The aperture 246 can be substantially flat or have a radius of curvature that corresponds to the curvature of a human finger. As such, when grasping the handle 212, the user can selectively cover the aperture 246 with their finger or thumb to permit suction from the suction port 224 to the suction device, or release (i.e., uncover) the aperture 246 to stop suction. Furthermore, by simply sliding a finger over the aperture 246 to various degrees, the operator can increase or decrease the power of suction while providing oral care. In some forms, the bristle array 218, the suction ports 224 are arranged along a front side of the shaft 214, and the aperture 426 is arranged along a back side of the shaft 214. Also, the aperture 246 can be a variety of shapes, including an oval, circle, tear-drop, or other shapes.

Accordingly, the suction system can transfer fluids, such as oral waste, out of an oral care recipient's mouth during the treatment for disposal. Fluid is suctioned from the oral care recipient's mouth first through the suction ports 224, then through the passageway 236 in the shaft 214 and the stem 222, and through the suction tube. All of the fluid transfer provided by the toothbrush system 210 during oral care treatment can, therefore, be physically contained and separated from the handle 212 so that no fluid is transferred internally through a housing 248 of the handle 212 which, as explained below, can contain electrical components. Separating fluid transfer components and electrical components provides potential benefits to hygiene, safety, and extended use in oral care treatment with the toothbrush system 210.

In addition to suction, the shaft 214 enables automated brushing via the bristle array 218. For example, a drive shaft 250 can extend through the body 230 of shaft 214 to mechanically and/or electrically couple the bristle array 218 to a drive system 279 within the handle 212. The drive system 279 (e.g., via a motor assembly 281) can enable the drive shaft 250 to provide rotational, oscillating, or vibrational motion to the bristle array 218 upon actuation of a user interface on the handle 212, as further described below. As shown in FIG. 18, the drive shaft 250 can extend through the body 230 on an opposite side of the wall 238 of the passageway 236 to reach the bristle array 218. Thus, the drive shaft 250 is generally not in contact with fluid of the suction system because the wall 238 separates the passageway 236 from an internal drive shaft section 252 of the shaft 214.

In some embodiments, the shaft 214 can be a single, integral component. In other embodiments, the shaft 14 can be formed from multiple components, such as multiple injected molded parts. For example, the shaft 214 can include a shaft front 254, a shaft back 256, the stem 222, and a brush head 258. These parts (e.g., the shaft front 252, the shaft back 256, the stem 222, and/or the brush head 258) can be coupled together, for example, via sonic welding, solvent welding, or via other methods of coupling plastic injection molded parts.

Similar to the example shown in FIGS. 5 and 6A, the shaft front 254 can include the suction port 224, a bristle portion formed at the distal end 226, and a coupling portion 262 at the proximal end 228. One of the suction ports 224 can be integrally formed in the shaft front 254, or formed of a flexible polymer that is overmolded or otherwise coupled to the shaft front 254, and another suction port 224 can be formed as an aperture in the distal end 226. The bristle portion 260 can be integrally formed with or configured to receive the brush head 258 (e.g., as a separate part that can be permanently or selectively coupled to the bristle portion via ultrasonic welding, solvent welding or otherwise). Additionally, the coupling portion 262 of the shaft front 254 can be configured to be coupled to both the stem 222 (e.g., to form the passageway 236) and the handle 214.

Furthermore, the shaft back 256 can be formed as a separate part that is sonically welded to the shaft front 254. The shaft back 256 (and/or the shaft front 254) includes the wall 238 that separates the passageway 236 from the internal drive shaft section 252. The shaft back 256 further includes an inner coupling port which can align with the coupling port of the shaft front 254. Furthermore, the passageway 236 can be substantially sealed from the internal drive shaft section 252 when the shaft 214 is fully assembled and coupled to the handle 212 (e.g., via an overmold 274). Additionally, the coupling portion 262 can be selectively coupled to and decoupled from an attachment device 276 of the handle 212. As a result, the shaft 214 can be selectively coupled to and decoupled from the handle 212 to permit reusing the handle 212 with different shafts 214.

More specifically, in some embodiments, various parts of the toothbrush system 210 can be disposable and replaceable. For example, in some embodiments, the shaft 214, the brush head 258, and/or the suction tube can be all removed and replaced after one or more uses. Accordingly, because these components can be removable, disposable, and/or replaceable, the toothbrush system 210 can provide repeated, hygienic oral care. The removability of the shaft 214 and the suction tube also makes it easy to keep the handle 212 clean through the use of toothbrush system 210 between multiple patients and/or with multiple shafts 224 and suction tubes. Further, the aperture 246 provides ergonomic, comfortable control of the suction functionality of the toothbrush system 210 along the handle 212 while still being separable from the handle 212.

Referring now to the handle 212, as shown in FIGS. 10-18, the handle 212 includes a housing 248, the attachment device 276, a lighting element 278, a drive system 279 including a controller 280, and an activation button 282. The housing 248 has a toothbrush end 284, a suction end 286, a front side 288, which aligns with the front of the shaft 214, and an opposite back side 290. Additionally, at least a portion of the housing 248 may be overmolded with a pliable rubber material, for example, with grooves, for easy handling.

As shown in FIG. 18, at the toothbrush end 284, the housing 248 can include the attachment device 276 which, as described above, receives the coupling portion 262 of the shaft 214 and allows selective coupling and decoupling of the shaft 214 to the handle 212. Furthermore, the housing 248 can accommodate the lighting element 278 at the toothbrush end 284 of the handle 212, which is configured to aid in illuminating the mouth of the care recipient. The lighting element 278 can include, for example, one or more LEDs arranged around the toothbrush end 284. For example, a portion of the housing 248 (such as the neck 232) may be at least partially transparent to permit internal LEDs at the lighting element 278 to emit light through the housing 248.

Furthermore, the LEDs are operably coupled to the controller 280 within the housing. The controller 280 can implement a variety of functions through the actuation of the activation button 282, which is also operatively connected to the controller 280. The controller 280 can control the drive system 279, which can include a motor assembly 281, and the mechanical motion produced by the motor assembly 281 can be translated to the bristle array 218 by the drive shaft 250. For example, when the activation button 282 is actuated in a given pattern, the handle 212 and, thus, the bristle array 218 can mechanically actuate, such as vibrate; the lighting element 278 can be turned ON or OFF; and/or the toothbrush system 210 can turn ON (e.g., lighting element 278 ON and the bristle array 218 being actuated) for a set period of time in accordance with oral care standards. Thus, a number of combinations of functioning can occur when a user actuates the activation button 282 of the toothbrush system 210. While the activation button 282 is shown at the front side 288 in FIGS. 11-18, the activation button 282 can be positioned on the front side 288 or the back side 290 of the handle 212.

Furthermore, as shown in FIG. 18, the handle 212 can include a user-accessible compartment 298 to hold a portable power source such as a single or multiple batteries 291. The batteries 291 can be replaceable, in which case the handle 212 can include a removable cover 299 for insertion and removal of the batteries within the compartment 298. For example, the cover 299 can be coupled to a main body of the handle 212 by a screw-on engagement (e.g., via threads on the cover 299 and the handle 212). In some implementations, the batteries 291 can be rechargeable, in which case the handle 212 can include charging leads (not shown) and can be plugged into a charging dock, or can include a charging port for receiving a charging plug.

As described above, generally, the suction system and the handle 212 can be assembled, as modular parts, to form the toothbrush system 210. More specifically, tubing of the suction device can be coupled to the shaft 214 via the coupling 234 of the stem 222 to form the suction system. The suction system can further be coupled to the handle 212 on the exterior of the housing 248. During use, the aperture 246 provides the user control of suction strength in the oral care recipient's mouth. When the suction device is activated and the aperture 246 is uncovered, the flow of fluid through the suction port 224 is reduced or nonexistent, and when the aperture 246 is covered by the user's finger, the suction produced at the suction port 224 is increased.

The toothbrush systems 10, 110, 210 described above all provide automatic brushing and suction (and/or massage). In some embodiments, any of the above toothbrush systems 10, 110, 210 can also incorporate irrigation. For example, any of the above systems 10, 110, 210 may include a separate lumen providing a pathway for irrigation (that is, separate from the suction passageway 36, 136, 236). As a result, such systems can be fully self-contained and portable with automatic brushing, suction, and irrigation. Such systems may be usable in hospital environments, or outside hospital environments, such as in long-term care facilities, subacute environments, or for home use.

Figure 19:
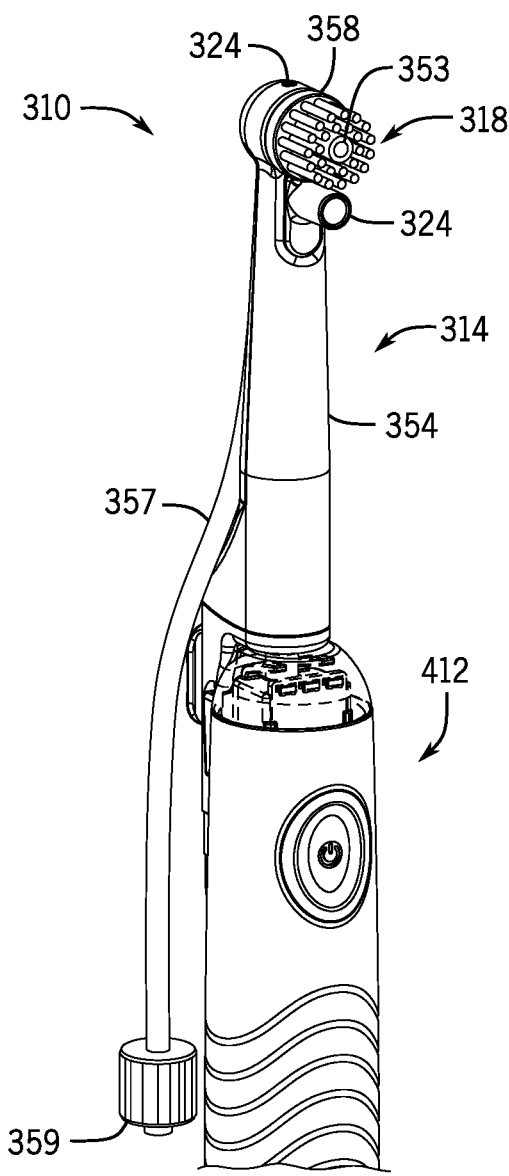
FIG. 19 is a partial front perspective view of an electric toothbrush in accordance with and/or for use with the present invention.
Figure 20:
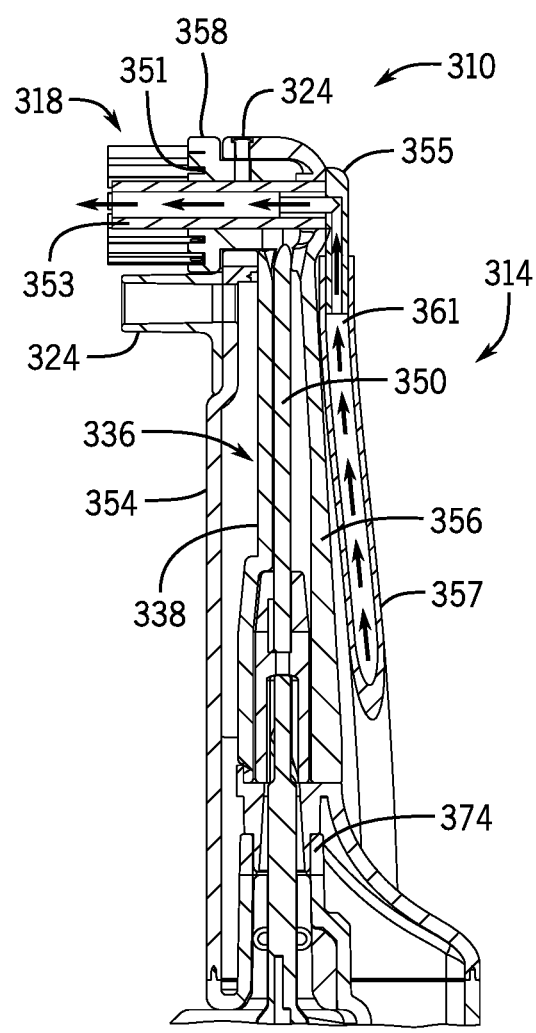
FIG. 20 is a partial cross-sectional view of the electric toothbrush of FIG. 19.
Figure 21:
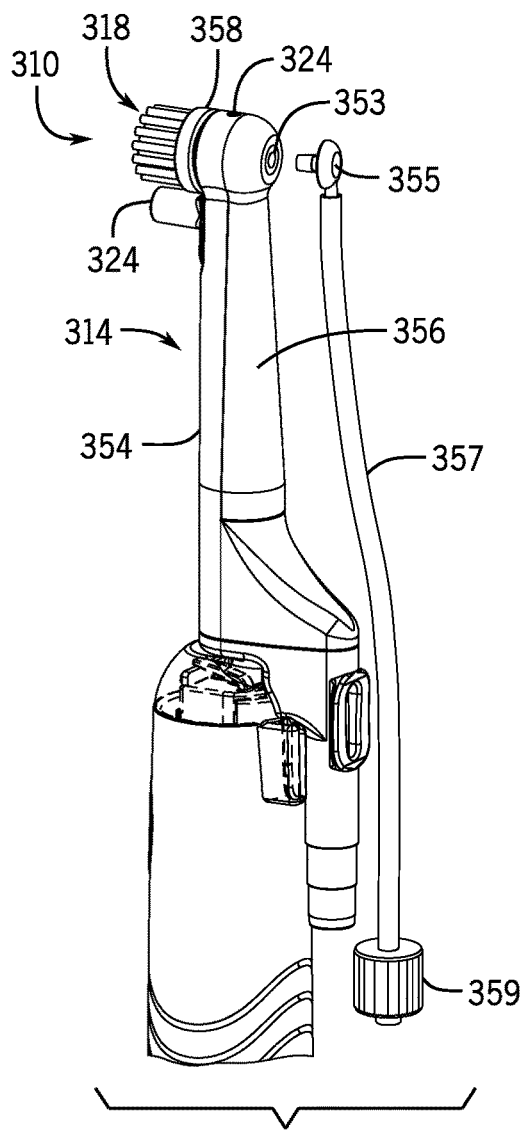
FIG. 21 is a partial exploded rear perspective view of the electric toothbrush of FIG. 19.

As such, FIGS. 19-21 illustrate a non-limiting example of a toothbrush system 310 that includes irrigation. The toothbrush system 310 can include a number of like features to toothbrush systems 10, 110, 210 and any or all of the functions and structures of the toothbrush systems 10, 110, 210 can be implemented in the analogous parts of the toothbrush system 310.

For example, generally, the toothbrush system 310 can include similar components as the toothbrush system 210 and, thus, like components are numbered accordingly. However, the toothbrush system 310 can include a shaft 314 that accommodate irrigation. More specifically, the shaft 314 can include a similar shaft front 354 with suction port 324 as that of the toothbrush system 210, but a different shaft back 356 and brush head 358 compared to the toothbrush system 210.

As shown in FIG. 20, the brush head 358 can include a hole 351 therethrough, with bristles of the bristle array 318 surrounding the hole 351. The shaft back 356 includes an overmolded irrigation port 353, or water outlet, that extends outward as a flexible tube. When assembled, the irrigation port 353 extends through the hole 351 of the brush head 358. As the irrigation port 353 extends outward parallel with the bristle array 318, the irrigation port 353 can be substantially flexible or pliable (e.g., of similar material as the suction port 324) so that it does not cause injury to the user during use of the toothbrush system 310 and, in some cases, can assist with brushing.

Furthermore, the shaft 314 includes a connector 355 configured to be coupled to (e.g., fit into) the irrigation port 353 from the shaft back 356, as shown in FIGS. 20 and 21. The connector 355 can further be coupled to tubing 357 (e.g., via a friction fit) and a syringe fitting 359, such as a luer lock fitting. As a result, an irrigation pathway 361 can be formed from the syringe fitting 359, through the tubing 357, the connector 355, and the irrigation port 353. A syringe (not shown) with irrigation fluid can be coupled to the syringe fitting 359 to direct the irrigation fluid through the irrigation pathway 361 to be expelled at the bristle array 318 while providing oral care to a user.

As shown in FIGS. 20 and 21, the irrigation port 353 can be a relatively short pathway extending through the distal end 326 of the shaft 314. Because the connector 355 is removable from the irrigation port 353, the toothbrush system 310 can be used without the connector 355 (and tubing 357 and syringe fitting 359) in place if irrigation is not desired. Furthermore, because the irrigation port 353 is a short pathway, and the connector 355, the tubing 357, and the syringe fitting 359 may be removable, these components may be easily cleaned, for example, with a pipe cleaner sized to fit through the irrigation pathway 361. The connector 355, the tubing 357, and/or the syringe fitting 359 may also be separately washed, such as in a dishwasher or sterilizer, or replaced after one or more uses.

Accordingly, the toothbrush system 310 can provide brushing, suction, and irrigation as a portable, handheld system. The suction passageway 336, the drive shaft section 352, and the irrigation pathway 361 can be sealed from each other as well as from the handle 312 to permit hygienic reuse of the handle 312 with different shafts 314. The shaft 314 may be disposable and replaceable after one or more uses. The shaft 314 may also be removed, cleaned or sanitized, and reused. For example, at least the suction passageway 336 and the irrigation pathway 361 may be accessible for rinsing (e.g., in a sink or dishwasher) and/or via a cleaning tool, such as a pipe cleaner, to clear bacteria or oral debris. The toothbrush system 310 can also still include a slim profile to facilitate use with debilitated users. Furthermore, in some embodiments, the shaft 314 can include a groove or clip (not shown) to contain the tubing 357 against the shaft 314. For example, maintaining the tubing 357 against the shaft 314 can help maintain the low slim profile and prevent issues that may result from accidentally biting the tubing 357.

Figure 22:
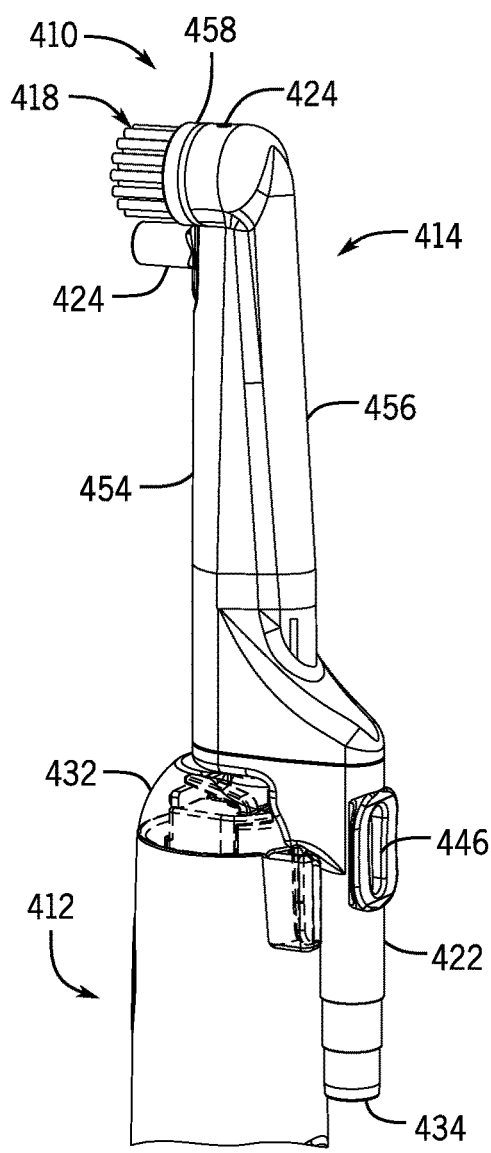
FIG. 22 is a partial rear perspective view of an electric toothbrush in accordance with and/or for use with the present invention.
Figure 23:
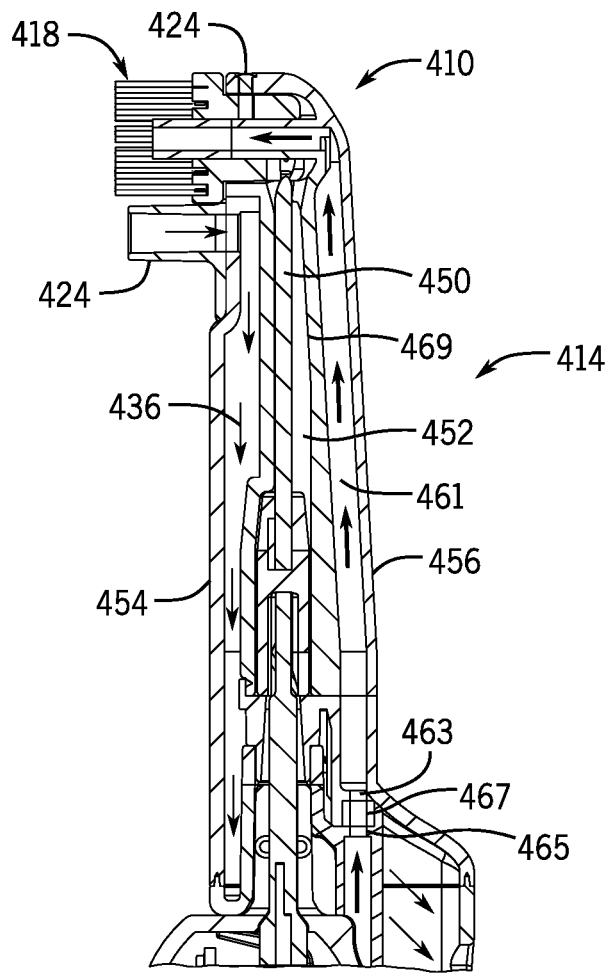
FIG. 23 is a partial cross-sectional view of the electric toothbrush of FIG. 22.
Figure 24:
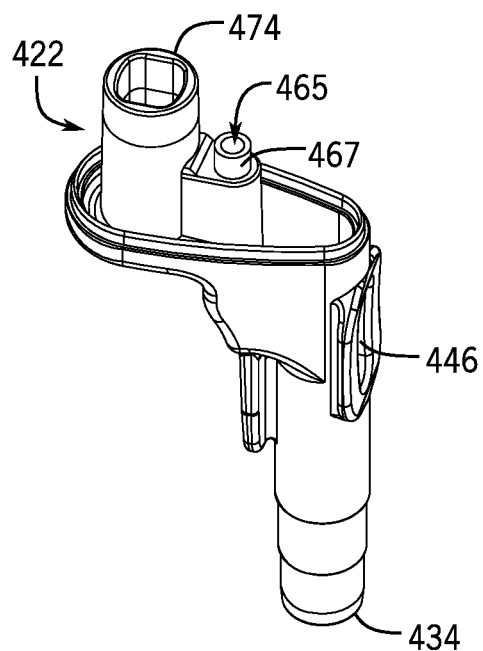
FIG. 24 is a rear perspective view of a stem of the electric toothbrush of FIG. 22.

FIGS. 22-24 illustrate another non-limiting example of a toothbrush system 410 with irrigation. The toothbrush system 410 can include a number of like features to toothbrush systems 10, 110, 210, 310 and any or all of the functions and structures of the toothbrush systems 10, 110, 210, 310 can be implemented in the analogous parts of the toothbrush system 410.

Generally, the toothbrush system 410 can include similar components as the toothbrush systems 210 and 310 and, thus, like components are numbered accordingly. However, in contrast to the external tubing 357 of the toothbrush system 310 routed along the shaft 314, the toothbrush system 410 can include a shaft 414 and a stem 422 that accommodates internally routed irrigation. More specifically, the shaft 414 can include a similar shaft front 454 with suction port 424, a similar brush head 458 with a hole 451, but a different shaft back 456 compared to the toothbrush system 310.

As shown in FIG. 23, the shaft back 456 includes an internal irrigation pathway 461, separate from a drive shaft section 452 (e.g., separated by a wall 469). The irrigation pathway 461 can include an overmolded irrigation port 453, or water outlet, that extends outward from the shaft back 456. When assembled, the irrigation port 453 extends through the hole 451 of the brush head 458. As shown in FIG. 23, the irrigation pathway 461 can extend from the overmolded irrigation port 453, through an entire length of the shaft back 456, to an outlet port 463.

Furthermore, as shown in FIGS. 23 and 24, the stem 414 includes a connector port 465 configured to be coupled to the outlet port 463 of the shaft back 456. For example, the connector port 465 can include an overmolded section 467 to seal the coupling. The connector port 465 can further be coupled to tubing and a syringe fitting, such as a luer lock fitting (not shown), for example, that can run parallel with the stem 422. Accordingly, the irrigation pathway 461 can extend from the syringe fitting, through the tubing, the connector port 465, and the irrigation port 453. A syringe (not shown) with irrigation fluid can be coupled to the syringe fitting to direct the irrigation fluid through the irrigation pathway 461 to be expelled at the bristle array 418 while providing oral care to a user.

Accordingly, the toothbrush system 410 can include the advantages described above with respect to the toothbrush system 310. Furthermore, the toothbrush system 410 can include a lower profile shaft 414 so that external tubing is not routed near the user's mouth but, rather, down along the handle 412 below the stem 422. That is, the tubing 357 of the toothbrush system 310 extends from the distal end 326, whereas the tubing of the toothbrush system 410 extends from the proximal end 428. Additionally, the irrigation pathway 461, as well as the suction passageway 463 may still be accessible for rinsing or cleaning with a tool (such as a pipe cleaner) to permit multiple uses.

Generally, the present invention provides a toothbrush designed to accommodate or compensate for a wide variety of impediments to oral hygiene. The toothbrush can be electrically driven and include a rotational and/or oscillating low profile head, at least one suction port for vacuum suction, a user interface with a lighting element, and/or at least one irrigation port for irrigation. The handle of the toothbrush provides access to the user interface so that at least automatic brushing and suction of the electric toothbrush can be controlled via a single hand without undue dexterity or cumbersome interactions.

The present invention has been described in terms of one or more preferred embodiments, and it should be appreciated that many equivalents, alternatives, variations, and modifications, aside from those expressly stated, are possible and within the scope of the invention.

The invention claimed is:

1. A toothbrush system, comprising:
   a shaft portion including:
      a main body having a first end and a second end,
      a bristle array and a suction port arranged at the second end of the main body, wherein the bristle array and the suction port both extend away from the shaft so that an opening of the suction port is proximate distal end of bristles of the bristle array, and
      a stem extending from the first end of the main body, the stem having an end configured to be coupled to an external suction source,
   wherein the stem and the main body are hollow, forming a passageway extending through the stem and the main body to provide fluid communication from the suction port to the end of the stem; and
   a handle removably coupled to the shaft portion, the handle including a drive system operably coupled to the bristle array to actuate motion of the bristle array;
   wherein the drive system of the handle is operably coupled to the bristle array by a drive shaft extending through the hollow main body; and
   wherein the stem extends in a first fixed direction away from the shaft portion and continues external to an outer wall of the handle in a second fixed direction parallel to a long axis of the handle, such that an entirety of the stem has a fixed spatial relationship with respect to the shaft portion and is external to the handle; and
   wherein the stem has an inner shape corresponding to a curvature of a neck of the handle, such that when the shaft portion is coupled to the handle, the stem follows the curvature of the neck.

2. The toothbrush system of claim 1, further comprising a suction tube configured to couple the stem to the external suction source.

3. The toothbrush system of claim 2, wherein the suction tube is selectively engaged with the handle.

4. The toothbrush system of claim 3, wherein the handle includes a housing with an external groove, and the suction tube fits into the external groove.

5. The toothbrush system of claim 1, wherein the stem extends down a length of the handle.

6. The toothbrush system of claim 1, wherein the stem includes an external opening.

7. The toothbrush system of claim 1, wherein the suction port is positioned below the bristle array.

8. The toothbrush system of claim 1, wherein the handle further includes a lighting element configured to illuminate an area proximate to the bristle array.

9. The toothbrush system of claim 1, wherein the suction port and the bristle array extend away from the shaft in parallel.

10. The toothbrush system of claim 1, wherein the drive system is configured to vibrate or oscillate the bristle array.

11. The toothbrush system of claim 1, wherein the drive shaft is configured to be selectively decoupled from the drive system, such that the drive shaft remains with the main body when the shaft portion is separated from the handle.

12. The toothbrush system of claim 1, wherein the main body and the stem are welded together.

13. The toothbrush system of claim 12, wherein the stem is coupled to the main body by a butt joint.

14. The toothbrush system of claim 1, wherein the stem is unitary with the main body of the shaft portion.

* * * * *